United States Patent
Ishii

(10) Patent No.: US 12,371,931 B2
(45) Date of Patent: Jul. 29, 2025

(54) LOCKING DEVICE FOR OPENING-CLOSING BODY, AND STORAGE DEVICE FOR VEHICLE

(71) Applicant: MORIROKU TECHNOLOGY COMPANY, LTD., Tokyo (JP)

(72) Inventor: Kouichi Ishii, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 154 days.

(21) Appl. No.: 17/918,718

(22) PCT Filed: Jun. 22, 2021

(86) PCT No.: PCT/JP2021/023515
§ 371 (c)(1),
(2) Date: Oct. 13, 2022

(87) PCT Pub. No.: WO2022/137608
PCT Pub. Date: Jun. 30, 2022

(65) Prior Publication Data
US 2023/0313577 A1 Oct. 5, 2023

(30) Foreign Application Priority Data
Dec. 25, 2020 (JP) .................. 2020-216617

(51) Int. Cl.
*E05C 9/04* (2006.01)
*E05B 83/30* (2014.01)
(Continued)

(52) U.S. Cl.
CPC ............ *E05C 9/04* (2013.01); *E05B 83/30* (2013.01); *E05C 9/006* (2013.01); *E05C 9/10* (2013.01)

(58) Field of Classification Search
CPC ... E05C 9/04; E05C 9/006; E05C 9/01; E05C 9/043; E05C 9/16; E05B 83/30;
(Continued)

(56) References Cited

U.S. PATENT DOCUMENTS 5,823,583 A * 10/1998 Sandhu ............... E05B 83/30
292/DIG. 31
8,141,398 B2 * 3/2012 Ookawara ........... E05C 1/145
292/109

(Continued)

FOREIGN PATENT DOCUMENTS

| CN | 101195360 A | 6/2008 |
| CN | 104583516 A | 4/2015 |

(Continued)

OTHER PUBLICATIONS

FR2634246A1 patent and Espacenet machine translation of description (Year: 2024).*

(Continued)

*Primary Examiner* — Kristina R Fulton
*Assistant Examiner* — Steven A Tullia
(74) *Attorney, Agent, or Firm* — Rankin, Hill & Clark LLP

(57) ABSTRACT

A locking device for an opening-closing body includes: a housing; a rotor that is rotatably supported by the housing; and at least one rod that is provided to move in and out from the housing when the rotor rotates, and that engages with and disengages from a locking portion. The housing includes an accommodating portion that slidably accommodates at least the one rod, the rotor includes a protrusion portion protruding in a rotation axis direction, and the rod includes a fitting recessed portion into which the protrusion portion is fittable. The protrusion portion is configured to be rotatable to a position where the protrusion portion escapes from a (Continued)

slide path of the rod with respect to the accommodating portion.

5 Claims, 17 Drawing Sheets

(51) Int. Cl.
*E05C 9/00* (2006.01)
*E05C 9/10* (2006.01)

(58) Field of Classification Search
CPC .......... E05B 83/28; E05B 79/08; E05B 79/06; E05B 85/10; E05B 85/14; E05B 85/16; E05B 85/18; B60R 7/06; Y10T 292/0836; Y10T 292/0844; Y10T 292/57; Y10T 292/097; Y10T 292/0834; Y10T 292/084; Y10T 292/0846; Y10T 292/0977; Y10T 292/0965; E05Y 2900/538
See application file for complete search history.

(56) References Cited

U.S. PATENT DOCUMENTS

| | | | | |
|---|---|---|---|---|
| 8,448,483 | B2 * | 5/2013 | Brant | B60R 7/04 |
| | | | | 292/DIG. 31 |
| 8,789,863 | B2 * | 7/2014 | Shimizu | E05B 83/30 |
| | | | | 292/336.3 |
| 9,121,206 | B2 * | 9/2015 | Shimizu | E05C 9/042 |
| 9,556,654 | B2 * | 1/2017 | Fukumoto | E05B 83/28 |
| 10,738,511 | B2 * | 8/2020 | Nakasone | E05C 9/04 |
| 2009/0090145 | A1 * | 4/2009 | Engelberth | E05D 15/505 |
| | | | | 70/159 |
| 2023/0003060 | A1 * | 1/2023 | Nakasone | E05C 9/04 |

FOREIGN PATENT DOCUMENTS

| | | | | | |
|---|---|---|---|---|---|
| CN | 108291413 | A | * | 7/2018 | ............ E05B 13/10 |
| CN | 109505471 | A | * | 3/2019 | ............ E05B 83/30 |
| CN | 108291412 | B | * | 6/2020 | ............ B60R 7/06 |
| EP | 0974723 | A2 | * | 7/1999 | ............ E05C 9/10 |
| EP | 2653638 | A1 | * | 10/2013 | ............ E05B 83/30 |
| EP | 3800311 | A1 | * | 4/2021 | ............ B60R 7/04 |
| FR | 2634246 | A1 | * | 7/1988 | ............ E05B 83/30 |
| FR | 2936549 | A1 | * | 4/2010 | ............ E05B 83/30 |
| JP | H11190161 | A | * | 12/1997 | ............ E05C 1/06 |
| JP | 2000-297564 | | | 10/2000 | |
| JP | 2002106225 | A | * | 4/2002 | ............ E05B 83/30 |
| JP | 2007170031 | A | * | 7/2007 | ............ E05B 83/30 |
| JP | 4197941 | B2 | * | 12/2008 | ............ E05B 65/12 |
| JP | 2009180028 | A | * | 8/2009 | ............ E05B 65/12 |
| JP | 2009-215740 | | | 9/2009 | |
| JP | 4355256 | B2 | * | 10/2009 | ............ E05B 83/30 |
| JP | 5367281 | B2 | * | 12/2013 | ............ E05B 65/12 |
| JP | 2014-173287 | | | 9/2014 | |
| JP | 2017002470 | A | * | 1/2017 | ............ E05B 15/04 |
| KR | 20030076115 | A | * | 3/2002 | ............ E05B 83/30 |
| KR | 100880909 | B1 | * | 11/2007 | ............ E05B 83/30 |
| WO | WO-2006024474 | A1 | * | 3/2006 | ............ E05B 13/005 |
| WO | WO-2012053819 | A2 | * | 4/2012 | ............ B60R 7/06 |
| WO | WO-2012132546 | A1 | * | 10/2012 | ............ E05B 63/14 |
| WO | WO-2015040820 | A1 | * | 3/2015 | ............ E05B 83/30 |
| WO | WO-2017094551 | A1 | * | 6/2017 | ............ E05B 13/10 |
| WO | WO-2017195557 | A1 | * | 11/2017 | ............ B60R 7/06 |
| WO | WO-2021085342 | A1 | * | 5/2021 | ............ E05B 77/38 |

OTHER PUBLICATIONS

JP2009180028 Espacenet machine translation claims and description (Year: 2024).*
International Search Report, Date of Mailing: Aug. 10, 2021, 2 pages.

* cited by examiner

LOCKING DEVICE FOR OPENING-CLOSING BODY, AND STORAGE DEVICE FOR VEHICLE

TECHNICAL FIELD

The present invention relates to a locking device for an opening-closing body that locks the opening-closing body in a closed state, the opening-closing body being openably and closably attached to an opening portion of a fixed body.

BACKGROUND ART

For example, an opening-closing body such as a lid is openably and closably attached to an opening portion formed in a fixed body such as a glove box or the like for automobile. Then, a locking device capable of locking the opening-closing body when the opening-closing body is closed and of releasing locking when the opening-closing body is opened is provided between the opening portion and the opening-closing body.

As the locking device of the related art, Patent Document 1 discloses a locking device for an opening-closing body including: a main body housing; a first sliding member and a second sliding member that move in and out from both sides of the main body housing; a rotor which is attached to a front surface of the main body housing and to which each sliding member is rotatably connected; an operation knob that is rotatably attached to the front surface of the main body housing and that includes a projection that pulls in each sliding member; and a pair of rods connected to both the respective sliding members. In addition, rod connection portions are formed on distal end sides of both the respective sliding members, and engaging recessed portions are formed on proximal end sides thereof. Further, a pair of pins protrude from the rotor.

Then, for example, the pair of rods are assembled to the rotor through the respective sliding members as follows. Namely, the pair of rods are connected to the rod connection portions of both the respective sliding members, and both the sliding members are inserted into respective insertion holes on both sides of the main body housing. Thereafter, in a state where the rotor is disposed on the front surface of the main body housing and the pair of pins are aligned with the engaging recessed portions of both the respective sliding members, the rotor is pushed in, so that the pair of pins engage with the respective engaging recessed portions, and the pair of rods are connected to the rotor through both the respective sliding members. Incidentally, after both the sliding members are connected to the rotor, the pair of rods may be connected to both the respective sliding members.

CITATION LIST

Patent Document

Patent Document 1: Japanese Unexamined Patent Publication No. 2009-215740

DISCLOSURE OF THE INVENTION

Problem to be Solved by the Invention

In the locking device of Patent Document 1, when the pair of rods are assembled to the rotor, both the sliding members are inserted into the respective insertion holes on both sides of the main body housing, and the pair of pins of the rotor are aligned with the engaging recessed portions of both the respective sliding members, and then the rotor is pushed in, so that the work of aligning the pins with respect to the engaging recessed portions and pushing in the rotor is required, and it cannot be said that the workability of assembling the pair of rods to the rotor is good.

Therefore, an object of the invention is to provide a locking device for an opening-closing body in which the workability of assembling a rotor and a rod can be improved.

Means for Solving Problem

According to the present disclosure, there is provided a locking device for an opening-closing body that is openably and closably attached to an opening portion of a fixed body, the locking device including: a housing attached to one of the fixed body and the opening-closing body; a rotor that is rotatably supported by the housing; and at least one rod that is provided to move in and out from the housing when the rotor rotates, and that engages with and disengages from a locking portion provided in the other of the fixed body and the opening-closing body. The housing includes an accommodating portion that slidably accommodates at least the one rod. The rotor includes a protrusion portion protruding in a rotation axis direction. The rod includes a fitting recessed portion into which the protrusion portion is fittable. The protrusion portion is configured to be rotatable to a position where the protrusion portion escapes from a slide path of the rod with respect to the accommodating portion.

Effect of the Invention

According to the invention, it is possible to provide the locking device for an opening-closing body in which the workability of assembling the rotor and the rod can be improved.

DETAILED DESCRIPTION OF THE PREFERRED EMBODIMENTS

Figure 1:
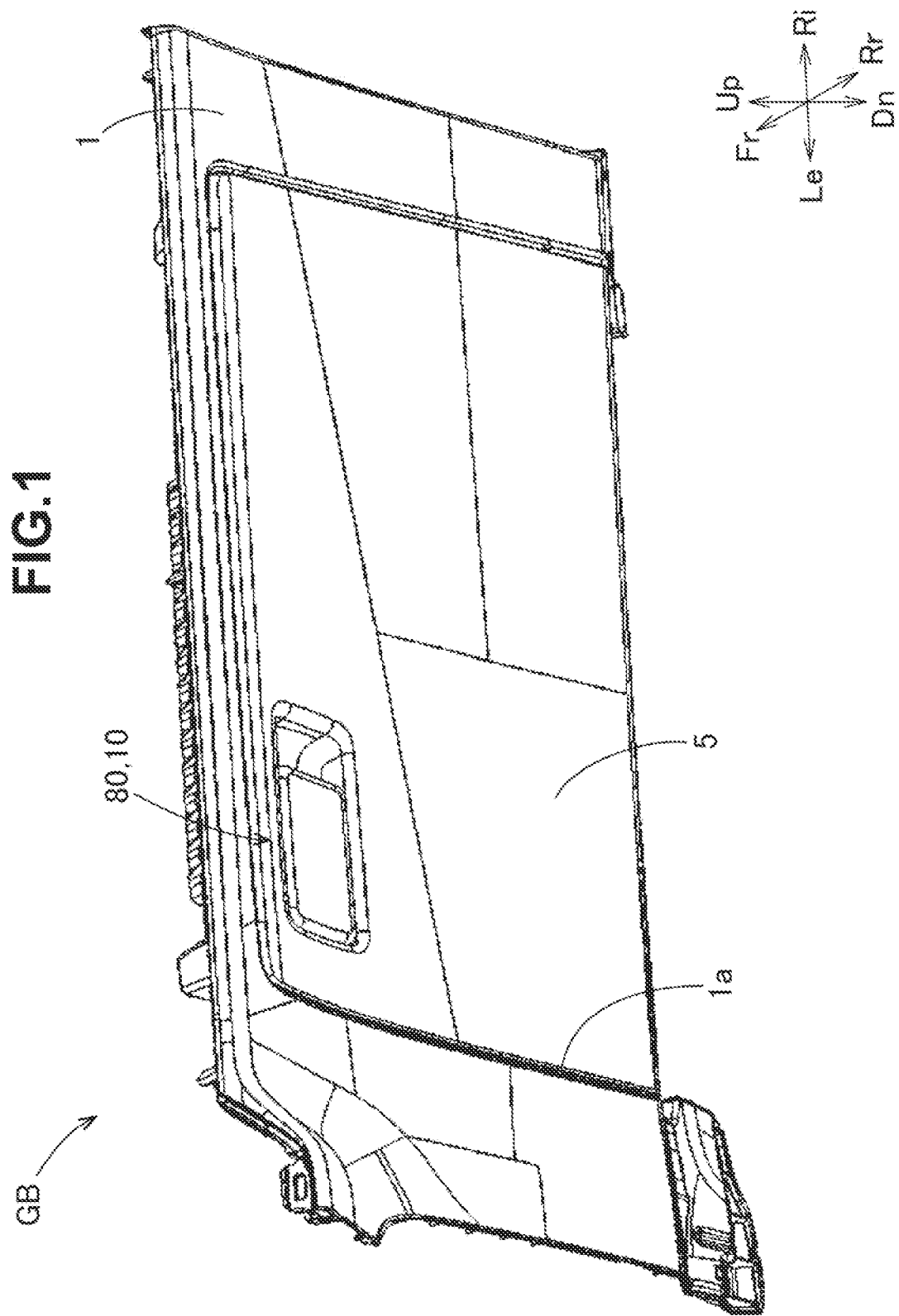
FIG. 1 is a perspective view of a glove box provided with a locking device for an opening-closing body according to a first embodiment.

Embodiments of the invention will be described below with reference to the accompanying drawings. Incidentally, in the description, right-left indicates right-left with reference to an occupant of a vehicle in which a locking device for an opening-closing body is provided, and front-rear indicates front-rear with reference to a traveling direction of the vehicle. In addition, in the drawings, Fr represents the front, Rr represents the rear, Le represents the left when viewed from the occupant, Ri represents the right when viewed from the occupant, Up represents the top or up, and Dn represents the bottom or down.

First Embodiment

Referring to FIG. 1, a locking device 10 for an opening-closing body (hereinafter, simply referred to as the "locking device 10") is provided in, for example, a glove box GB (storage device for vehicle GB) provided at a front portion of the vehicle. The glove box GB is a storage portion that is openably and closably provided at a front end of a passenger compartment to store occupant's belongings or the like.

In more detail, the glove box GB includes an instrument panel 1 which extends in a right-left direction at the front end of the passenger compartment and in which an opening portion 1a is formed in part, and a lid 5 that is swingably supported by the instrument panel 1 to be able to open and close the opening portion 1a. The storage portion for storing the occupant's belongings or the like is integrally formed with the instrument panel 1 or is integrally formed with a lid 5.

Hereinafter, the instrument panel 1 fixed in the passenger compartment is referred to as a fixed body 1. In addition, the lid 5 capable of opening and closing the opening portion 1a is referred to as the opening-closing body 5.

The locking device 10 is supported by the opening-closing body 5 to be able to hold the opening-closing body 5 in a state where the opening-closing body 5 closes the opening portion 1a. In addition, when the opening-closing body 5 is swung to open the opening portion 1a, the locking device 10 is operated to release a locked state, so that the opening-closing body 5 can be swung.

Figure 2:
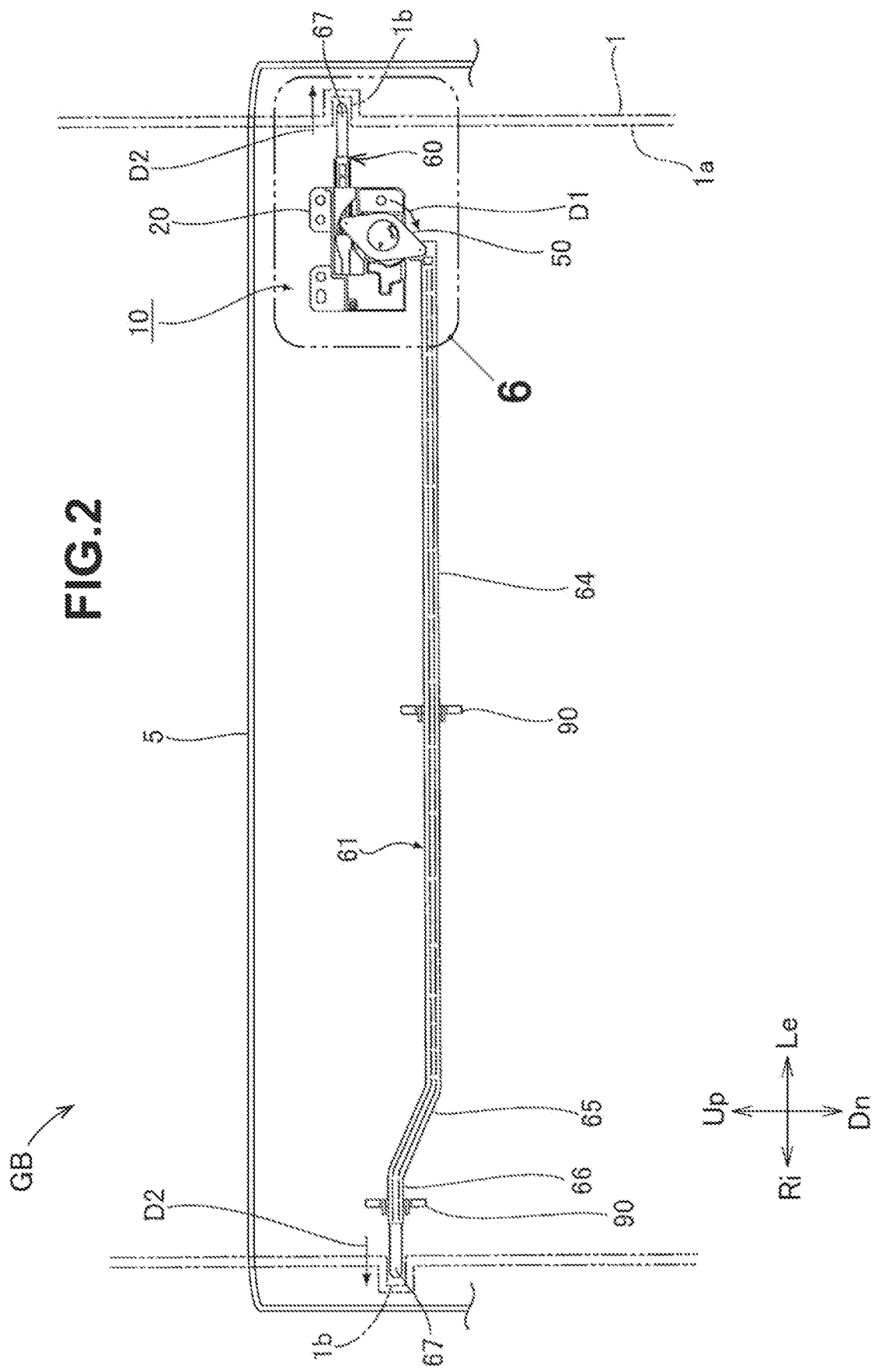
FIG. 2 is an enlarged view of main parts of an opening-closing body and the locking device for an opening-closing body illustrated in FIG. 1 when viewed from the front.

Referring to FIG. 2, locking portions 1b and 1b each having a recessed shape are formed at both right and left ends of the opening portion 1a of the fixed body 1, respectively. Incidentally, each of the locking portions 1b and 1b may have a hole shape, a projection shape, a frame shape, or the like instead of having a recessed shape. In addition, the locking portions 1b and 1b may be provided in the opening-closing body 5 instead of being provided in the fixed body 1, and are not particularly limited.

Figure 3:
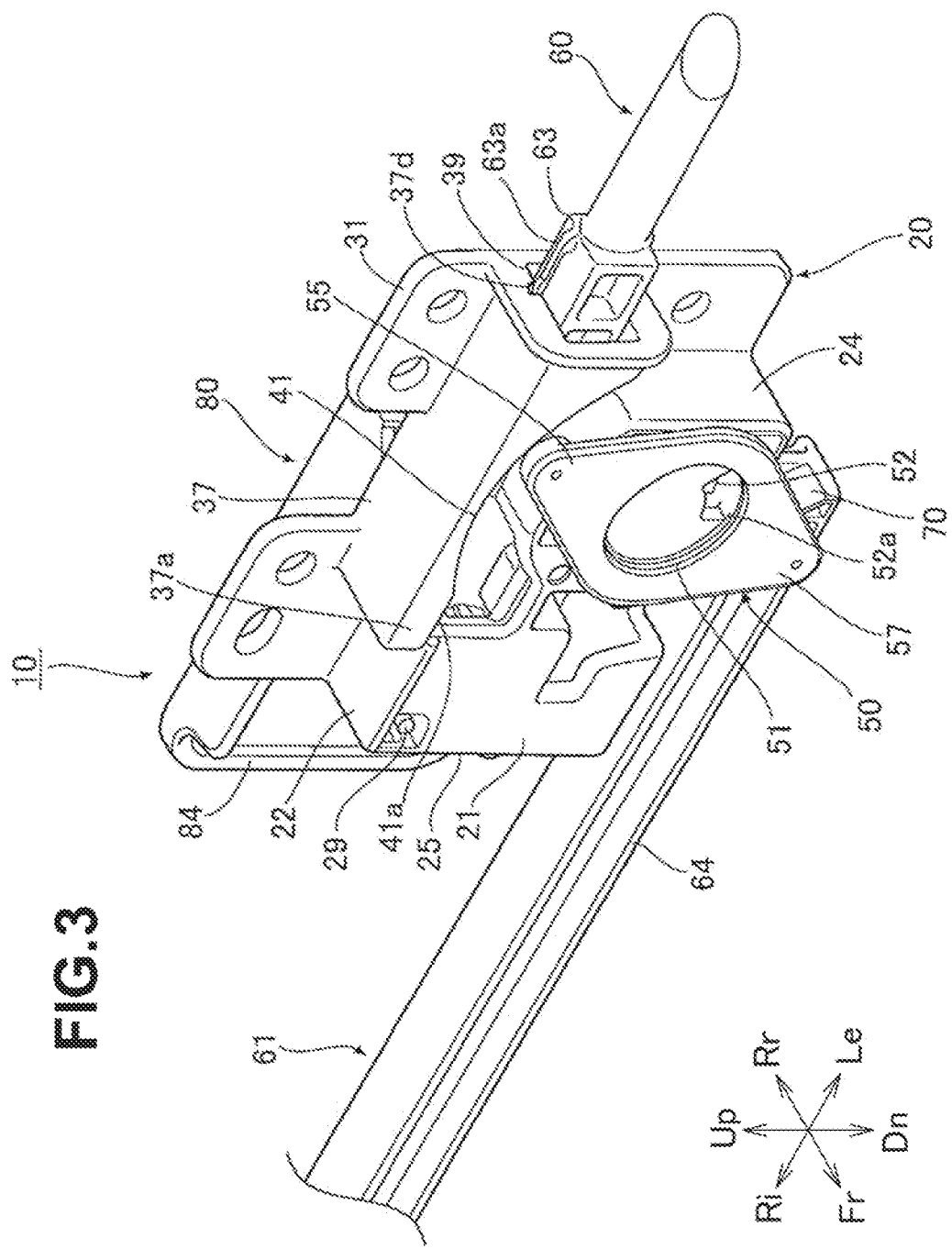
FIG. 3 is a perspective view of the locking device for an opening-closing body illustrated in FIG. 2.
Figure 4:
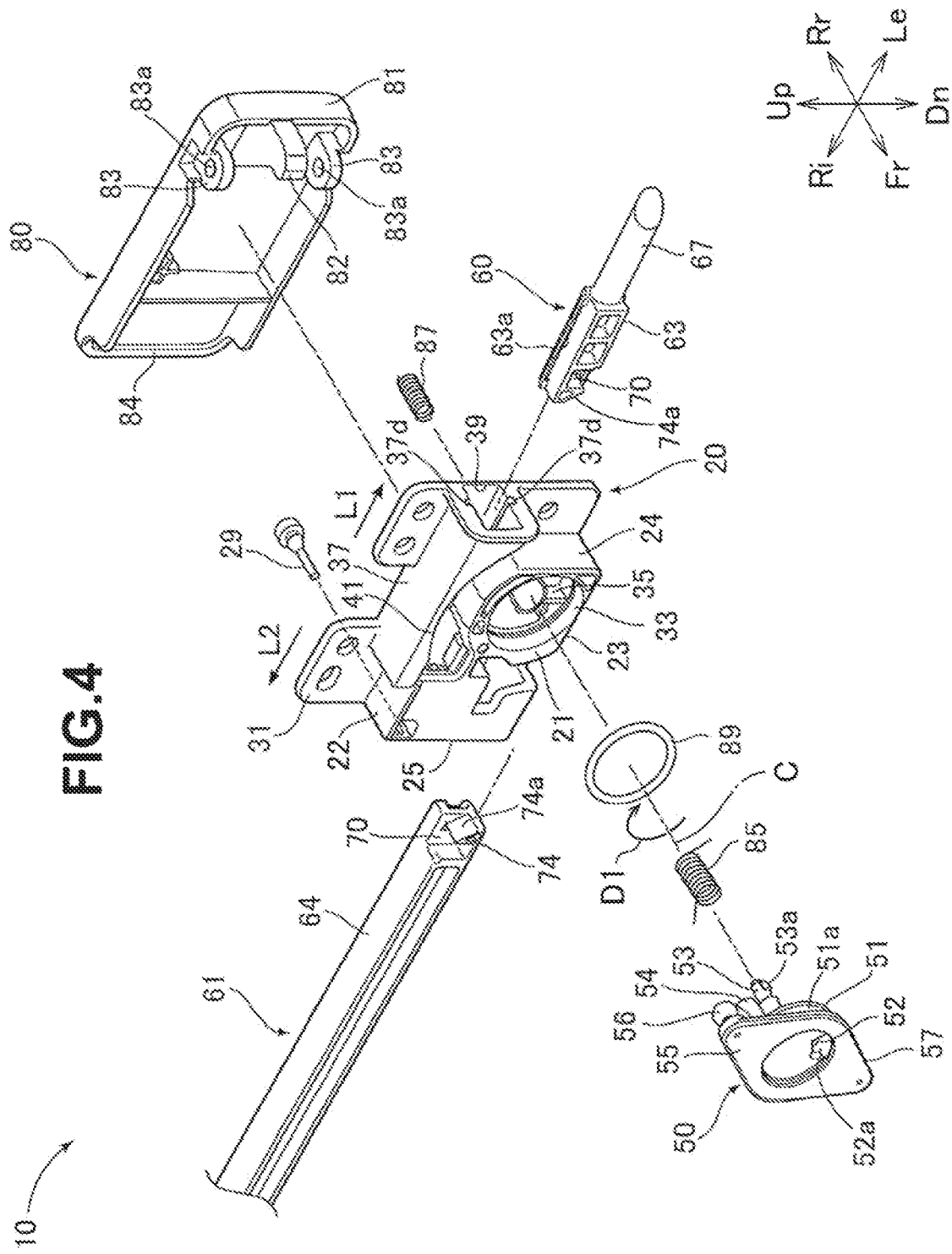
FIG. 4 is an exploded perspective view of the locking device for an opening-closing body illustrated in FIG. 3.

Referring to FIG. 3 and FIG. 4, the locking device 10 includes a housing 20 attached to the opening-closing body 5 (refer to FIG. 1); a rotor 50 that is rotatably supported by the housing 20 through a rotation support portion; and a pair of rods 60 and 61 (a first rod 60 and a second rod 61) that are pivotally supported at one end portions by the rotor 50 to move in and out from the housing 20 when the rotor 50 rotates, and that engage with and disengage from the locking portions 1b and 1b (refer to FIG. 2), respectively.

Figure 5:
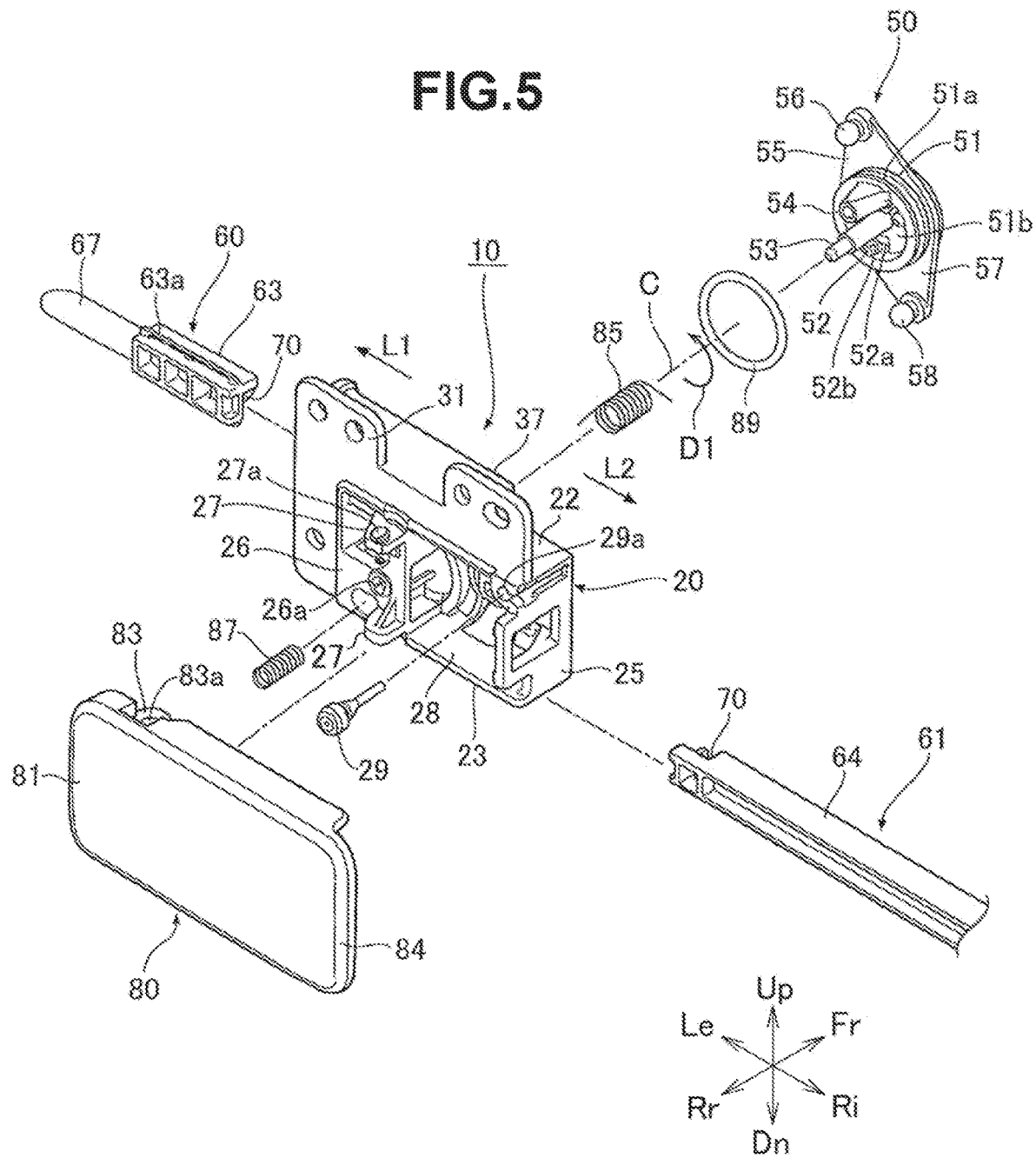
FIG. 5 is an exploded perspective view of the locking device for an opening-closing body illustrated in FIG. 3 when viewed from the rear.

Referring to FIG. 4 and FIG. 5, the locking device 10 further includes a first biasing member 85 that rotationally biases the rotor 50 in a predetermined direction to bias each of the rods 60 and 61 to engage with the locking portion 1b (refer to FIG. 2), and an operation member 80 that is rotatably mounted on a rear surface side of the housing 20 to rotate the rotor 50 in a direction opposite a rotation biasing direction (refer to arrow D1 of FIG. 2). Incidentally, the second rod 61 is longer than the first rod 60, and is disposed below the housing 20.

For example, a torsion spring can be used as the first biasing member 85. Incidentally, the first biasing member may be, for example, a pull spring or the like that pulls the rods 60 and 61 toward locking portion sides, or may be able to bias the rods to engage with the respective locking portions.

Referring to FIG. 2 and FIG. 4, the rotor 50 is biased by the first biasing member 85 to rotate in the direction indicated by arrow D1. As indicated by arrow D2, the first rod 60 and the second rod 61 connected to the rotor 50 are biased to engage with the respective locking portions 1b.

Referring to FIG. 4 and FIG. 5, the housing 20 includes a bottom wall 21 located in the front to extend long in one direction; a pair of side walls 22 and 23 standing from both side peripheral edges along long sides of the bottom wall 21; one end wall 24 disposed on one end side in a longitudinal direction of the bottom wall 21 to connect the pair of side walls 22 and 23 to each other; the other end wall 25 disposed on the other end side in the longitudinal direction of the bottom wall 21 to connect the pair of side walls 22 and 23 to each other; and a top wall 26 disposed opposite the bottom wall 21 to cover a portion close to the other end wall 25 within a predetermined range, and has a substantially long box shape inside which an internal space 28 is defined. Incidentally, one end side in the longitudinal direction of the housing 20 is denoted by reference sign "L1", the housing 20 having a long box shape, and the other end side in the longitudinal direction is denoted by reference sign "L2".

In addition, a shaft support hole 26a having a keyhole shape is formed in the top wall 26. A support shaft 53 of the rotor 50 is inserted into the shaft support hole 26a, and the rotor 50 is rotatably supported by the housing 20. Further, a pair of protruding pieces 27 and 27 protrude from both sides of the shaft support hole 26a on a front surface side of the top wall 26, and a projection 27a is provided on an outer side of a distal end of each of the protruding pieces 27 (only the projection 27a on an upper side is illustrated in the drawing).

The operation member 80 is rotatably mounted on the rear surface side of the housing 20 through the pair of protruding pieces 27 and 27.

The operation member 80 will be described in relation to this, and the operation member 80 has a substantially rectangular shape that is long in the right-left direction. An operation lever 82 and a pair of protruding pieces 83 and 83 provided with shaft holes 83*a* protrude from a front surface side of a proximal end portion 81 of the operation member 80. Then, the projections 27*a* and 27*a* of the pair of protruding pieces 27 and 27 of the housing 20 are inserted into the shaft holes 83*a* and 83*a* of the pair of protruding pieces 83 and 83 of the operation member 80, respectively, with a second biasing member 87 (here, a coil spring) interposed between the housing 20 and a proximal end portion 81 side of the operation member 80, so that the proximal end portion 81 of the operation member 80 is rotatably supported and the operation member 80 is rotatably mounted on the rear surface side of the housing 20.

As a result, the operation member 80 can be set to be rotatable in a direction in which a distal end portion 84 separates from and approaches the housing 20, with the proximal end portion 81 as a fulcrum. In addition, the operation member 80 is constantly biased by the second biasing member 87 in a direction in which a distal end portion 84 side approaches the housing 20.

Incidentally, the shape or structure of the operation member is not limited to the foregoing mode, and for example, the structure may be such that the operation member is pushed in against the housing to rotate the rotor (push type).

Returning to the description of the housing 20, a damper mounting hole 29*a* is formed at a corner on the other end L2 side in the longitudinal direction of the housing 20. A damper 29 made of rubber is mounted in the damper mounting hole 29*a* to reduce tapping sound when the operation member 80 is rotated.

In addition, an attachment portion 31 having a plate shape extends from an outer surface of the side wall 22 or the other end wall 25 forming the housing 20. For example, the attachment portion 31 is fastened to the opening-closing body 5 (refer to FIG. 2) using a fastening member.

Further, a rotor accommodating recessed portion 33 that accommodates a main body 51 of the rotor 50 is formed in the bottom wall 21. In addition, a reverse rotation restricting wall 35 is formed inside the rotor accommodating recessed portion 33. A reverse rotation restricting claw 52 (to be described later) of the rotor 50 is caught by the reverse rotation restricting wall 35 to restrict the reverse rotation of the rotor 50.

Figure 6:
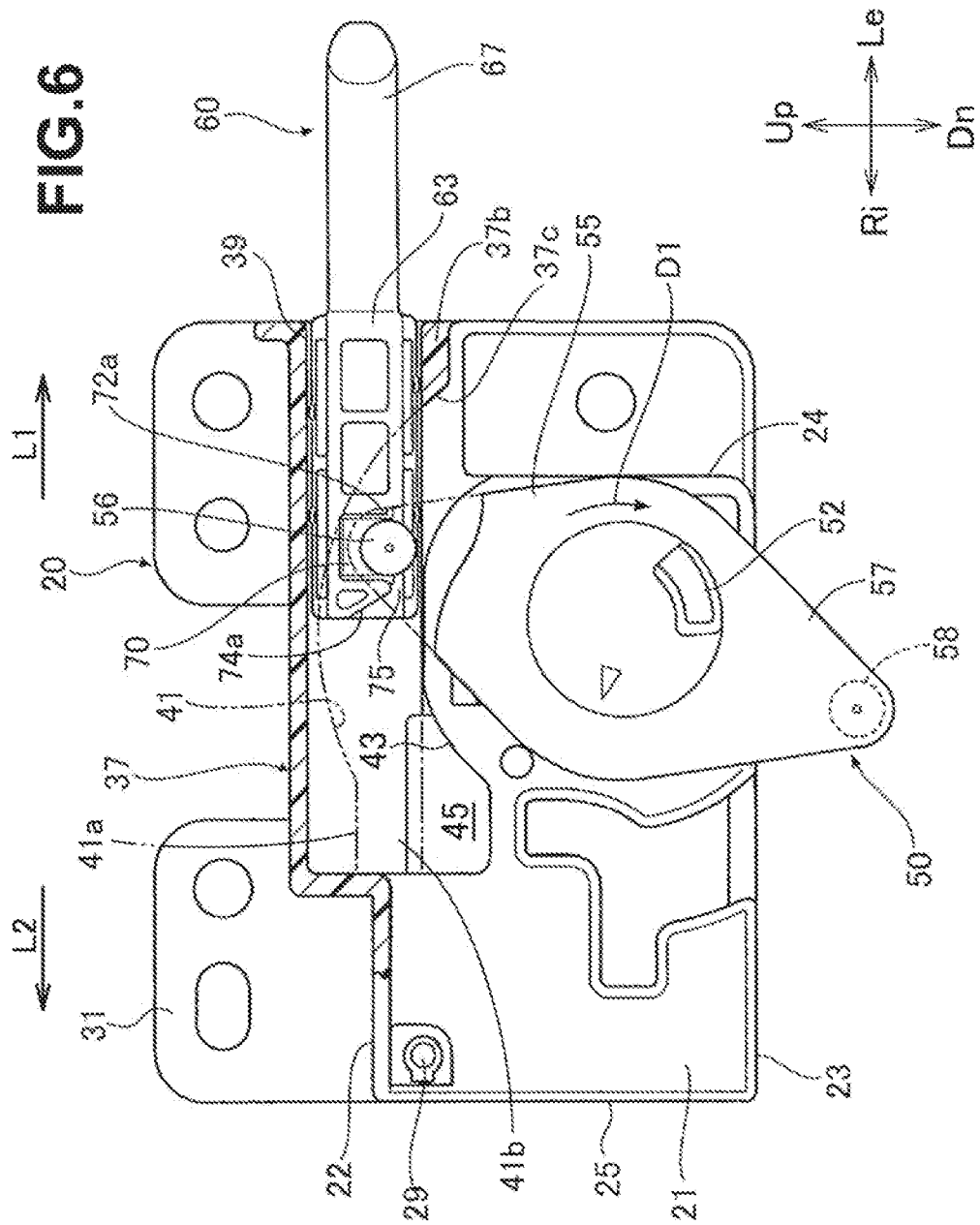
FIG. 6 is an enlarged cross-sectional view of main parts of a portion 6 of FIG. 2.

Referring to FIG. 6, further, the housing 20 includes an accommodating portion 37 that slidably accommodates at least one rod (here, the first rod 60); a frame-shaped opening portion 39 provided at one end of the accommodating portion 37 to surround the first rod 60 so as to be movable in and out therefrom; a cutout portion 41 formed to communicate with the accommodating portion 37 to allow a protrusion portion (here, a first protrusion portion 56) (to be described later) of the rotor 50 to enter the accommodating portion 37; and an arc surface portion 43 that is an arc-shaped surface around a rotation center of the rotor 50 and that is formed below a lower surface of the first rod 60.

As illustrated in FIG. 4, the accommodating portion 37 having a frame shape is provided on a side wall 22 side of the housing 20. Specifically, the accommodating portion 37 has a long frame shape extending a predetermined length from one end L1 side toward the other end L2 side in the longitudinal direction of the housing 20 along the longitudinal direction of the housing 20, and is provided in the housing 20 such that the other end side of the accommodating portion 37 is connected to the side wall 22 of the housing 20 and one end side thereof protrudes from the one end wall 24 of the housing 20. Incidentally, an internal space of the accommodating portion 37 communicates with the internal space 28 of the housing 20 (refer to FIG. 5).

In addition, the frame-shaped opening portion 39 having a substantially quadrangular hole shape and surrounding the first rod 60 is formed at one end in the longitudinal direction of the accommodating portion 37 (one end L1 side in the longitudinal direction of the housing 20), and the first rod 60 is movable in and out from the frame-shaped opening portion 39.

Further, the cutout portion 41 that is cut out in a substantially arc shape along a rotation trajectory of the rotor 50 is formed in a bottom wall 37*a* of the accommodating portion 37. In addition, the bottom wall 37*a* of the accommodating portion 37 protrudes slightly high from the bottom wall 21 toward the front surface side of the housing, and can receive a predetermined range of a first extension portion 55 (to be described later) of the rotor 50 in a thickness direction (refer to FIG. 3).

Incidentally, the rotation trajectory of the rotor 50 means a rotation trajectory of the first extension portion 55 of the rotor 50 on a distal end side in an extending direction. Further, the cutout portion 41 communicates with the internal space of the accommodating portion 37, and the first protrusion portion 56 of the rotor 50 can enter the internal space of the accommodating portion 37 through the cutout portion 41.

Figure 7:
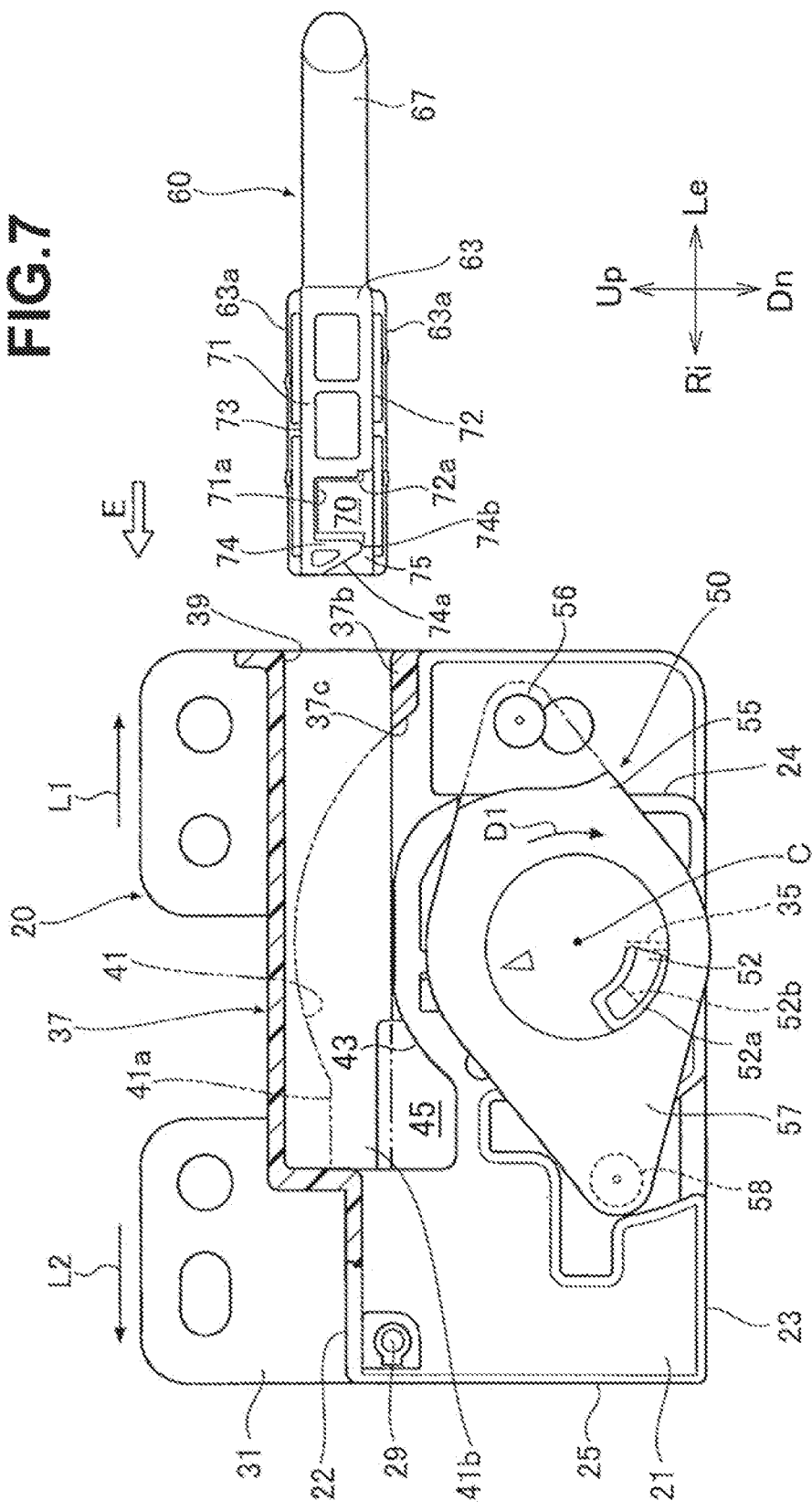
FIG. 7 is an exploded view illustrating a state where a first rod of the locking device for an opening-closing body illustrated in FIG. 6 is removed.

Referring to FIG. 6 and FIG. 7, an opening 37*c* communicating with the cutout portion 41 is formed in a side wall 37*b* of the accommodating portion 37, the side wall 37*b* being a portion protruding from the one end wall 24 of the housing 20 and facing the inside of the housing. The first protrusion portion 56 of the rotor 50 can enter the cutout portion 41 from the opening 37*c*.

In addition, a linear portion 41*a* extending along the longitudinal direction of the housing 20 is formed on the other end side of the cutout portion 41 opposite the frame-shaped opening portion 39 (other end L2 side in the longitudinal direction of the housing 20). A wide portion 41*b* having a constant width is formed from the other end side of an arc-shaped portion of the cutout portion 41 toward the other end L2 side in the longitudinal direction of the housing 20 through the linear portion 41*a*.

Further, a retraction portion 45 which is a space adjacent to the arc surface portion 43 and into which the first protrusion portion 56 can be retracted when the first rod 60 is pushed in is formed in the housing 20. The retraction portion 45 is a space that is continuously formed from the accommodating portion 37, and only the first protrusion portion 56 can enter the retraction portion 45. In other words, the first rod 60 cannot enter the retraction portion 45.

Further, as illustrated in FIG. 4, guide grooves 37*d* and 37*d* are formed in facing inner surfaces of the accommodating portion 37 along the longitudinal direction of the accommodating portion 37. Elastic guide pieces 63*a* and 63*a* (to be described later) of the first rod 60 are inserted into the guide grooves 37*d* and 37*d*, respectively.

Incidentally, in the housing 20, the accommodating portion 37 is formed only on the side wall 22 side, and the first rod 60 is accommodated in the accommodating portion 37, but an accommodating portion may also be provided on a side wall 23 side of the housing, and the second rod may be accommodated in the accommodating portion (this mode will be described in another embodiment to be described later).

In addition, the shape or structure of the housing is not limited to the foregoing mode. Further, all the portions (the bottom wall, the side walls, the top wall, the attachment portion, the accommodating portion, the cutout portion, and the like) forming the housing are integrally formed.

Next, the rotor 50 will be described. As illustrated in FIG. 4 or 5, the rotor 50 includes the main body 51 having a bottomed cylindrical shape of which an outer periphery has a circular shape, and the first extension portion 55 and a second extension portion 57 each having a substantially triangular plate shape extend outward in a radial direction from locations that are on the outer periphery of the main body 51 and that face each other in the radial direction. Further, the rotor 50 includes protrusion portions (the first protrusion portion 56 and a second protrusion portion 58) protruding from the respective extension portions 55 and 57 in a direction along a rotation axis C of the rotor.

Incidentally, the rotor may include the protrusion portions 56 and 58 that are fittable into fitting recessed portions 70 of the respective rods 60, without being provided with the extension portions described above. It can be said that the rotor 50 includes the extension portions (the first extension portion 55 and the second extension portion 57) extending from the rotation axis C in the radial direction.

A ring mounting groove 51a is formed in the outer periphery of the main body 51, and a seal ring 89 is mounted in the ring mounting groove 51a. The seal ring 89 is in sliding contact with an inner periphery of the rotor accommodating recessed portion 33 of the housing 20.

In addition, the first protrusion portion 56 and the second protrusion portion 58 protrude from distal end portions in the extending direction on rear surface sides of the first extension portion 55 and the second extension portion 57, respectively. Incidentally, the second protrusion portion 58 provided on a second extension portion 57 side protrudes in the same direction as that of the first protrusion portion 56 provided on a first extension portion 55 side. Further, the first protrusion portion 56 provided on the first extension portion 55 side is fitted into the fitting recessed portion 70 (to be described later) of the first rod 60. On the other hand, the second protrusion portion 58 provided on the second extension portion 57 side is fitted into the fitting recessed portion 70 of the second rod 61.

In addition, as illustrated in FIG. 6, the second extension portion 57 extends downward from a lower surface of the housing 20 in a state where the rotor 50 is rotatably supported by the housing 20.

Referring to FIG. 5, the support shaft 53 protrudes from a center of a rear surface side of a bottom portion 51b of the main body 51. A projection 53a (refer to FIG. 4) protrudes from an outer periphery of a distal end of the support shaft 53. The support shaft 53 is inserted into the shaft support hole 26a of the housing 20, so that the rotor 50 is rotatably supported by the housing 20. Namely, the support shaft 53 on a rotor 50 side and the shaft support hole 26a on a housing 20 side form the foregoing "rotation support portion". Incidentally, the rotation support portion may include, for example, the support shaft protruding from the housing side, and the shaft support hole formed on the rotor side, and is not particularly limited.

In addition, a pressed portion 54 protrudes from a position adjacent to the support shaft 53 on the rear surface side of the bottom portion 51b of the main body 51. The pressed portion 54 is pressed by the operation lever 82 of the operation member 80 to be rotated in a direction opposite a biasing direction D1 (refer to FIG. 6) against a rotational biasing force of the first biasing member 85.

Further, the reverse rotation restricting claw 52 is formed on the bottom portion 51b of the main body 51 to be flexible through a slit 52a having an arc shape. A claw portion 52b protrudes from a free end side of the reverse rotation restricting claw 52.

Incidentally, the rotor 50 having the foregoing configuration is rotationally biased by a biasing force of the first biasing member 85 described above (a torsion spring, a pull spring, or the like) acting in a direction in which the first rod 60 and the second rod 61 engage with the respective locking portions 1b. In addition, the shape or structure of the rotor is not limited to the foregoing mode. Further, all the portions (the main body, the support shaft, the pressed portion, both the extension portions, both the protrusion portions, and the like) forming the rotor are integrally formed.

Next, the first rod 60 and the second rod 61 will be described.

As illustrated in FIG. 4 and FIG. 5, the first rod 60 is formed to be shorter than the second rod 61, and has a rod shape including a proximal portion 63 having a substantially quadrangular prism shape and extending a predetermined length, and a locking pin 67 having a substantially columnar shape that is provided at a distal end of the proximal portion 63 to engage with and disengage from the locking portion 1b (refer to FIG. 2). In addition, the elastic guide pieces 63a and 63a that are flexibly deformable and that are inserted into the guide grooves 37d and 37d provided in the accommodating portion 37 are provided at both end portions in the longitudinal direction of the proximal portion 63. The elastic guide pieces 63a and 63a are in elastic sliding contact with the guide grooves 37d and 37d, respectively, to suppress rattling of the first rod 60 and to contribute to guiding the sliding of the first rod 60.

On the other hand, as illustrated in FIG. 2, the second rod 61 has a substantially crank shape including a proximal portion 64 extending longer than the proximal portion 63 of the first rod 60 (refer to FIG. 4); an intermediate portion 65 extending from a distal end of the proximal portion 64 in an inclined manner; and a distal end portion 66 extending from a distal end of the intermediate portion 65 to be parallel to the proximal portion 64 and to be shorter than the proximal portion 64. Incidentally, the proximal portion 64, the intermediate portion 65, and the distal end portion 66 all have a substantially quadrangular prism shape. Further, the locking pin 67 having a substantially columnar shape that engages with and disengages from the locking portion 1b is provided at a distal end of the distal end portion 66.

Referring to FIG. 4 and FIG. 5, the fitting recessed portion 70 into which the first protrusion portion 56 provided on the first extension portion 55 of the rotor 50 is fitted is formed on a proximal end side of the proximal portion 63 of the first rod 60. Further, the fitting recessed portion 70 into which the second protrusion portion 58 provided on the second extension portion 57 of the rotor 50 is fitted is formed on a proximal end side of the proximal portion 64 of the second rod 61.

Referring to FIG. 7, the fitting recessed portion 70 includes an opening portion that is formed to face the cutout portion 41 in a state where the rod (here, the first rod 60) is accommodated in the accommodating portion 37. The opening portion includes a first opening portion 72a that is open on a side that is a rotation axis C side of the rotor 50 and that faces outer peripheries of the protrusion portions 56 and 58, and a second opening portion 71a that is open in a direction opposite a protruding direction (rotation axis direction) of the protrusion portions 56 and 58 protruding from the rotor 50. Incidentally, the first opening portion 72a is formed in a side surface 72 located on the rotation axis C side of the rotor 50, and the second opening portion 71a is formed in a front surface 71 located on an extension portions 55 and 57 side.

More specifically, the fitting recessed portion 70 is defined by a side wall 73 extending along an insertion direction E of the first rod 60 into the accommodating portion 37, and a distal end wall 74 disposed orthogonal to the side wall 73 on a distal end side in the insertion direction E. The second opening portion 71a is formed in the front surface 71 facing the extension portions 55 and 57 side of the rotor 50, to open in the direction opposite the protruding direction of the protrusion portions 56 and 58, and the first opening portion 72a is formed to open on the side that is the rotation axis C side of the rotor 50 and that faces the outer peripheries of the protrusion portions 56 and 58.

Incidentally, the fitting recessed portion 70 provided on a second rod 61 side (refer to FIG. 4) also has the same structure as that of the fitting recessed portion 70 provided on a first rod 60 side, and will be described in another embodiment to be described later. In addition, the fitting recessed portion 70 of the second rod 61 may be shaped, for example, in a quadrangular frame shape that is open only on a front surface 71 side, and the second protrusion portion 58 on the second extension portion 57 side of the rotor 50 may be fittable into the fitting recessed portion 70.

In addition, an inclined surface 74a that is inclined to approach the first opening portion 72a is formed on an outer surface of the wall (distal end wall 74) that defines the fitting recessed portion 70 on the distal end side of the rod (here, the first rod 60) in the insertion direction E with respect to the accommodating portion 37. A gap 75 is formed between the first opening portion 72a and a top portion 74b of the inclined surface 74a provided on the distal end wall 74.

Incidentally, the shape or structure of the rod is not limited to the foregoing mode. Further, all the portions (the proximal portion, the intermediate portion, the distal end portion, the locking pin, the fitting recessed portion, and the like) forming the rod are integrally formed.

Next, actions and effects of the locking device 10 including the foregoing configurations will be described.

As illustrated in FIG. 2, the locking pins 67 and 67 of the pair of rods 60 and 61 engage with the locking portions 1b and 1b of the fixed body 1, respectively, in a state where the opening-closing body 5 is closed, so that the locking device 10 can lock the opening-closing body 5 in a closed state.

Figure 8:
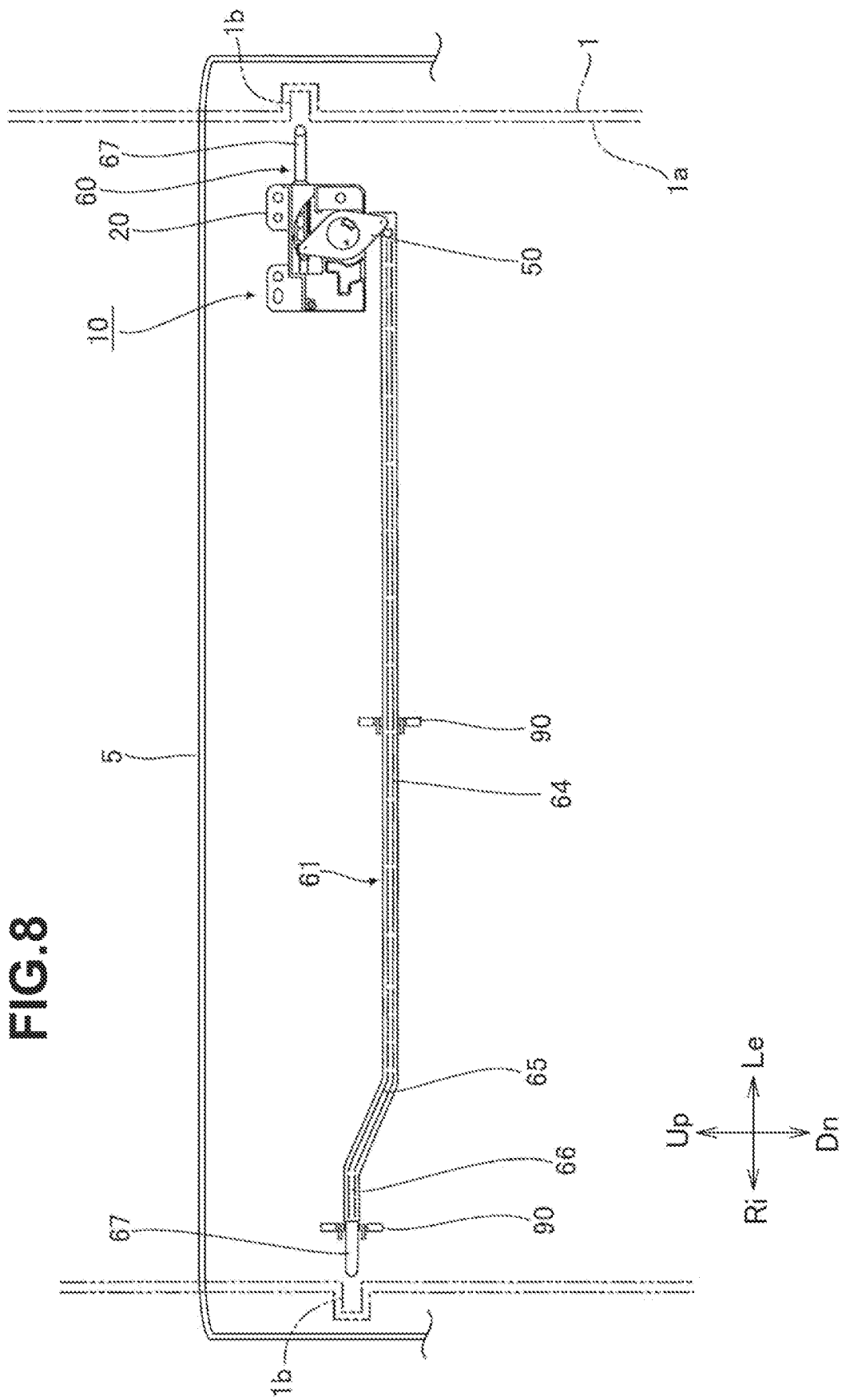
FIG. 8 is a view illustrating an unlocked state of the locking device for an opening-closing body illustrated in FIG. 2.

Referring to FIG. 5 and FIG. 8, switching from a locked state to an unlocked state is performed by rotating the distal end portion 84 of the operation member 80 in a direction away from the housing 20 (rearward) against a biasing force of the second biasing member 87. The locking pins 67 and 67 of the pair of rods 60 and 61 are pulled out from the locking portions 1b and 1b against the rotational biasing force of the rotor 50, and the locked state of the opening-closing body 5 is released. Accordingly, the opening-closing body 5 can be opened from the opening portion 1a of the fixed body 1.

Next, a method for assembling the rotor 50 and the pair of rods 60 and 61 to the housing 20 will be described. When the rotor 50 and the pair of rods 60 and 61 are assembled to the housing 20, with the first biasing member 85 interposed between the housing 20 and the rotor 50, the projection 53a of the support shaft 53 of the rotor 50 is aligned with the shaft support hole 26a having a keyhole shape of the housing 20 and the rotor 50 is pushed in from the front surface side of the housing 20.

Referring to FIG. 5 and FIG. 7, the support shaft 53 is inserted into the shaft support hole 26a, so that the rotor 50 is rotatably supported by the housing 20, and the claw portion 52b of the reverse rotation restricting claw 52 is located on the other end L2 side of the reverse rotation restricting wall 35, so that the rotor 50 is temporarily supported to be rotatable with respect to the housing 20.

Then, the rod (first rod 60) can be assembled to the rotor 50 by performing the following two types of rod assembly works.

A first assembly work is performed as follows.

Referring to FIG. 4 and FIG. 5, in a state where the projection 53a of the support shaft 53 of the rotor 50 is aligned with and inserted into the shaft support hole 26a of the housing 20, the claw portion 52b of the reverse rotation restricting claw 52 is located on the other end L2 side of the reverse rotation restricting wall 35. In this state, the rotor 50 is rotatably supported by the housing 20, but the support shaft 53 is only inserted into the shaft support hole 26a, and the projection 53a is not located on a rear surface side of the shaft support hole 26a, so that the rotor 50 is not retained with respect to the housing 20. In the state illustrated in FIG. 7, the rotor 50 is temporarily supported to be rotatable with respect to the housing 20 (temporary support state of the rotor 50).

Figure 9:
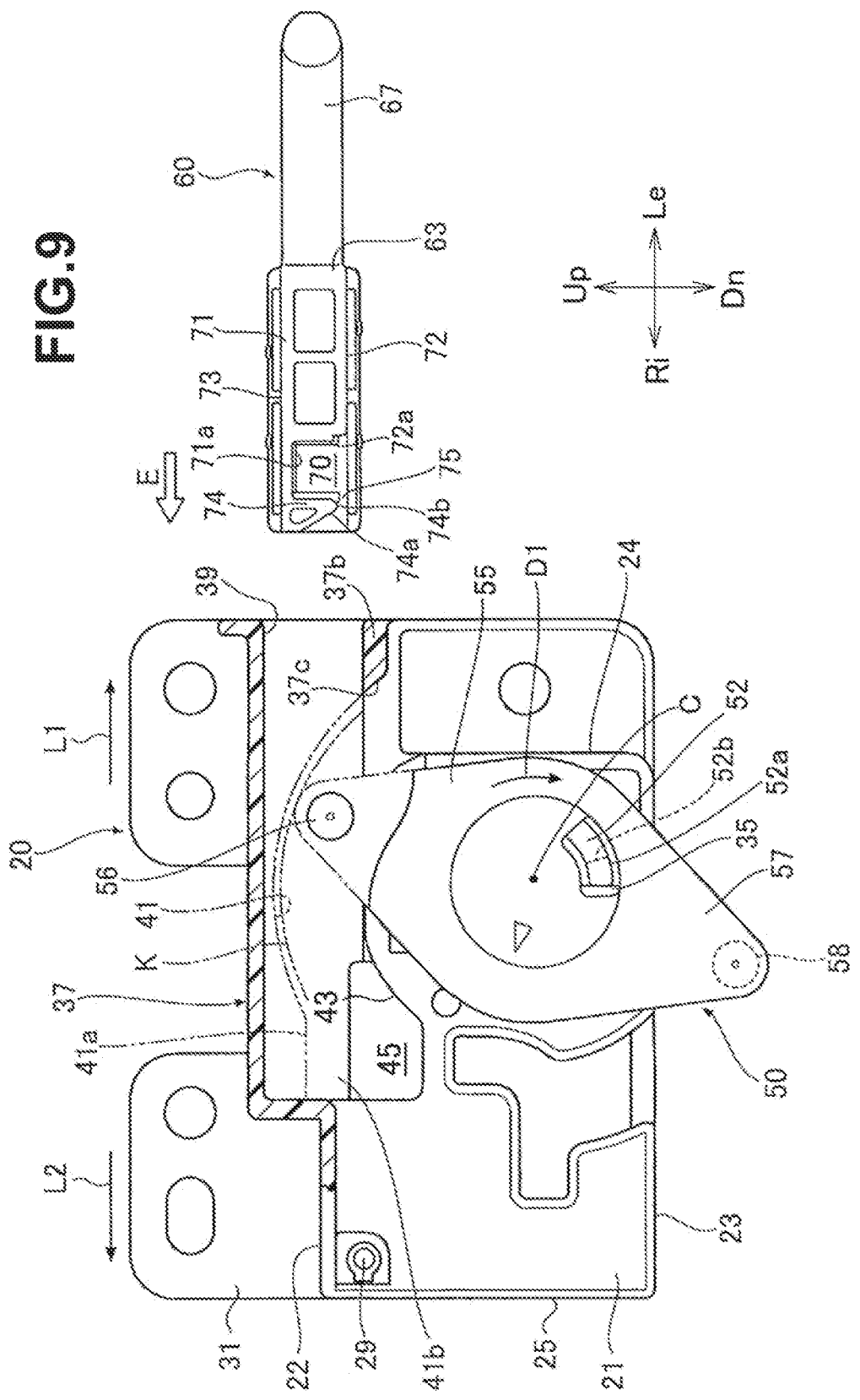
FIG. 9 is a view for describing a rotor that is held in a retained state in a housing illustrated in FIG. 6.

In a state where the rotor 50 is temporarily supported by the housing 20 to be rotatable, the first protrusion portion 56 of the rotor 50 is located outside the one end wall 24 of the housing 20, but the rotor 50 is rotated in the direction opposite the biasing direction D1 against the rotational biasing force of the first biasing member 85 (refer to FIG. 4), so that as illustrated in FIG. 9, the first protrusion portion 56 passes through the opening 37c to enter the cutout portion 41.

At this time, the claw portion 52b of the reverse rotation restricting claw 52 climbs over the reverse rotation restricting wall 35 to be located on the one end L1 side of the reverse rotation restricting wall 35, so that the reverse rotation of the rotor 50 is restricted. Namely, since the claw portion 52b of the reverse rotation restricting claw 52 is caught to the one end L1 side of the reverse rotation restricting wall 35, even when the rotor 50 is tried to further rotate in the biasing direction D1 from this state, the rotor 50 does not rotate. Then, in the state illustrated in FIG. 9, since the projection 53a of the support shaft 53 is located at a peripheral edge on the rear surface side of the shaft support hole 26a, the rotor 50 is retained and held with respect to the housing 20. Namely, the rotor 50 is supported to be rotatable with respect to the housing 20 in a retained state (retained hold state of the rotor 50).

The rotor 50 is rotated in the direction opposite the biasing direction D1 from the state illustrated in FIG. 7 in which the rotor 50 is temporarily supported to be rotatable with respect to the housing 20. Accordingly, the first protrusion portion 56 of the rotor 50 passes through the opening 37c of the accommodating portion 37 to enter the accommodating portion 37 through the cutout portion 41, the claw portion 52b of the reverse rotation restricting claw 52 climbs over the reverse rotation restricting wall 35 to be located on the one end L1 side of the reverse rotation restricting wall 35, and the projection 53a of the support shaft 53 is located at the peripheral edge on the rear surface side of the shaft support hole 26a, so that the rotor 50 is retained and held with respect to the housing 20 (refer to FIG. 9). In the state illustrated in FIG. 9, the first rod 60 is inserted into the accommodating portion 37 from the frame-shaped opening portion 39 along the insertion direction E (entry direction).

Figure 10:
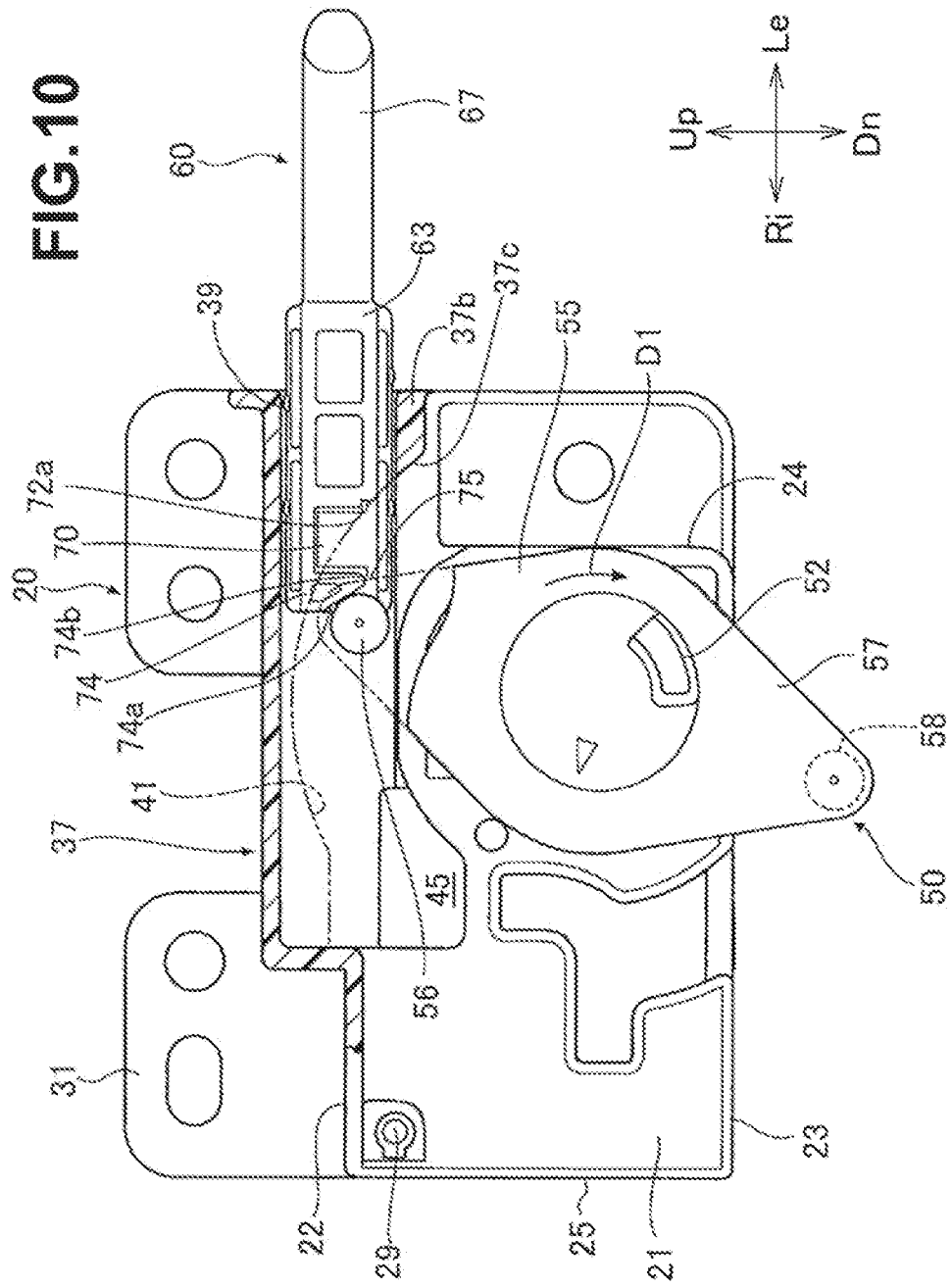
FIG. 10 illustrates a first step when the rod is assembled to the rotor from the state illustrated in FIG. 9, and is a view for describing a state where the rod is inserted into an accommodating portion.
Figure 11:
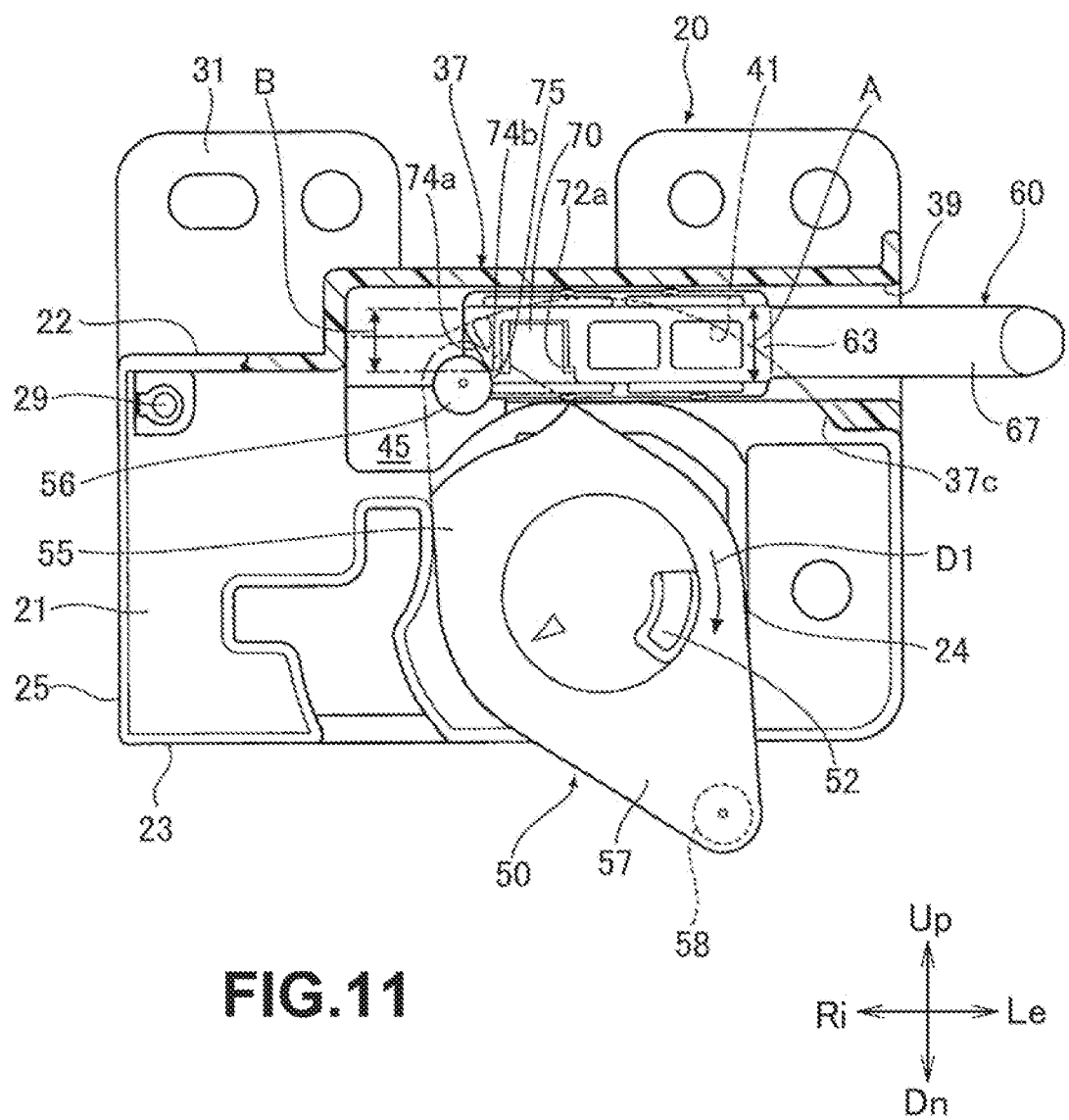
FIG. 11 illustrates a second step when the rod is assembled to the rotor, and is a view for describing a state where the rod is further inserted and the rotor is rotated from the state illustrated in FIG. 10.
Figure 12:
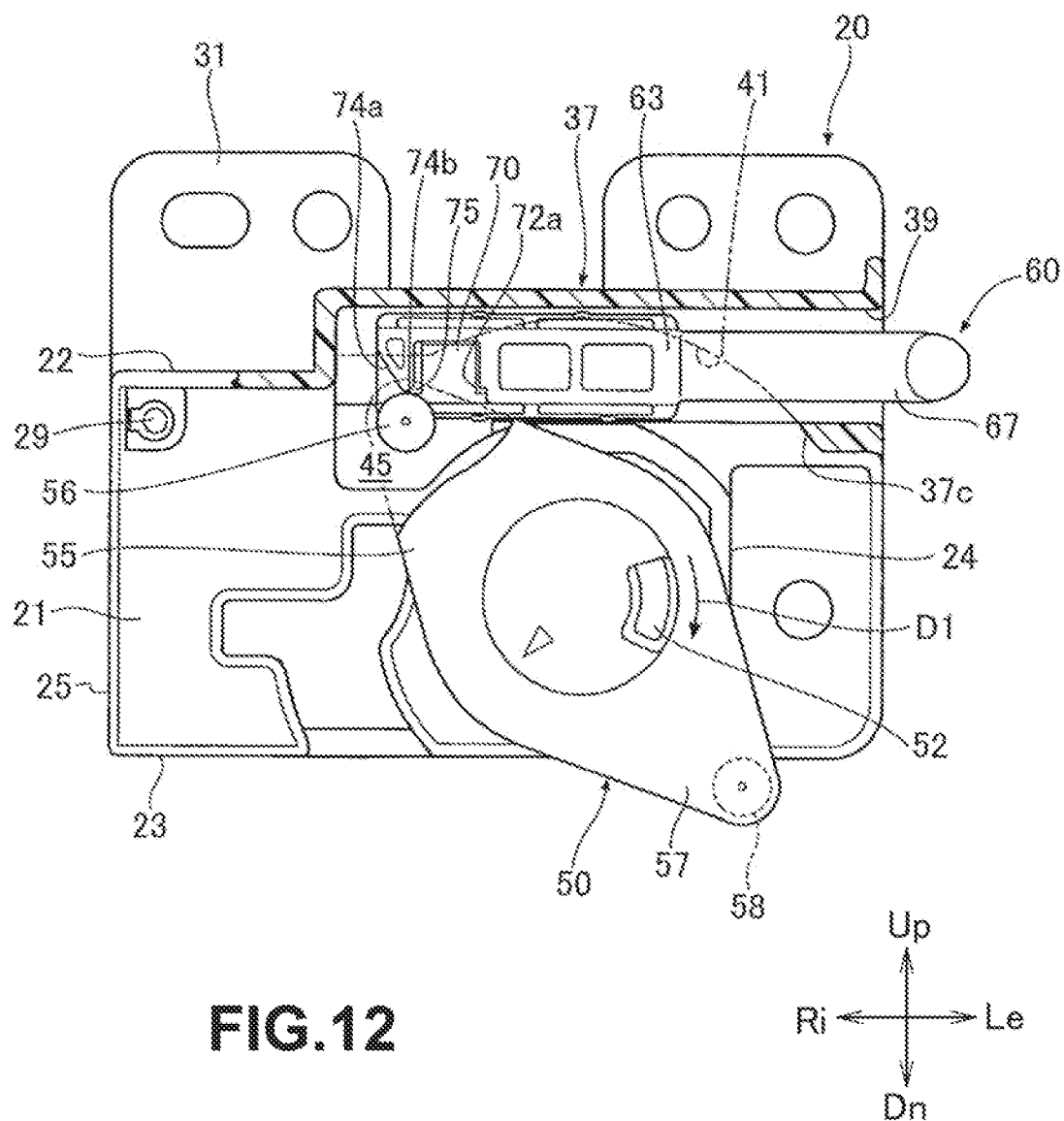
FIG. 12 illustrates a third step when the rod is assembled to the rotor, and is a view for describing when a protrusion portion climbs over a top portion of an inclined surface from the state illustrated in FIG. 11.

Then, as illustrated in FIG. 10, the inclined surface 74a of the first rod 60 presses the first protrusion portion 56 of the rotor 50, and as illustrated in FIG. 11, the rotor 50 is further rotated in the direction opposite the biasing direction D1. At this time, a part of the first protrusion portion 56 enters the retraction portion 45. Then, as illustrated in FIG. 12, when the first protrusion portion 56 climbs over the top portion 74b of the inclined surface 74a, the first protrusion portion 56 passes through the first opening portion 72a through the gap 75. The amount of entry of the first protrusion portion 56 into the retraction portion 45 is maximized immediately before the first protrusion portion 56 passes over the top portion 74b. Further, when the rotor 50 rotates in the biasing direction D1, as illustrated in FIG. 6, since the first protrusion portion 56 is inserted and fitted into the fitting recessed portion 70 of the first rod 60, the first rod 60 can be connected to the rotor 50.

Further, as illustrated in FIG. 11, a width A of the proximal portion 63 (length from one side surface to the other side surface excluding the elastic guide pieces 63a) of the first rod 60 is set to be larger than a width B of the distal end wall 74 (length from the one side surface excluding the elastic guide piece 63a to the top portion 74b) on which the inclined surface 74a is provided. As a result, the gap 75 is formed, and the first protrusion portion 56 easily climbs over the top portion 74b. The gap 75 enables the first protrusion portion 56 to be easily inserted into the fitting recessed portion 70 and to be easily pulled out from the fitting recessed portion 70.

On the other hand, a second assembly work is performed as follows.

From the state illustrated in FIG. 7 in which the rotor 50 is temporarily supported to be rotatable with respect to the housing 20, the rotor 50 is slightly rotated in the direction opposite the biasing direction D1 to the extent that the rotor 50 is not retained and held with respect to the housing 20 (to the extent that the claw portion 52b of the reverse rotation restricting claw 52 does not climb over the reverse rotation restricting wall 35 not to be located on the one end L1 side of the reverse rotation restricting wall 35). Accordingly, the first protrusion portion 56 of the rotor 50 passes through the opening 37c of the accommodating portion 37 to enter the accommodating portion 37 through the cutout portion 41, and while maintaining that state, the first rod 60 is inserted into the accommodating portion 37 from the frame-shaped opening portion 39 along the insertion direction E.

Figure 13:
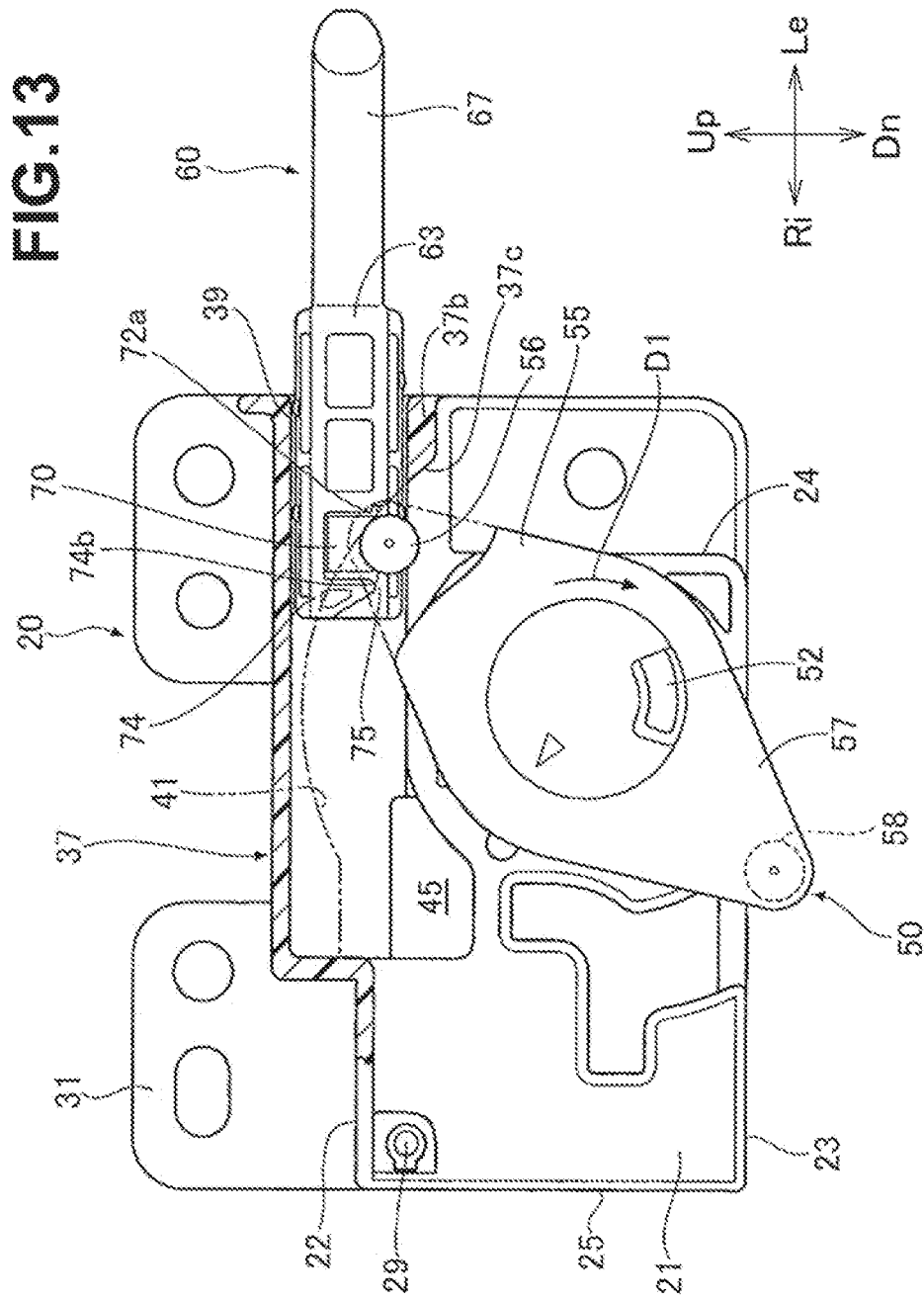
FIG. 13 is a descriptive view illustrating a step when the rod is assembled to the rotor from a temporary support state of the rotor illustrated in FIG. 7.

Then, as illustrated in FIG. 13, the rotation position of the first protrusion portion 56 and the insertion amount of the first rod 60 are appropriately adjusted to cause the first protrusion portion 56 to pass through the first opening portion 72a through the gap 75 and to be inserted into the fitting recessed portion 70 of the first rod 60, so that the first protrusion portion 56 is fitted into the fitting recessed portion 70. Therefore, in this case as well, as illustrated in FIG. 6, the first rod 60 can be connected to the rotor 50.

Further, a removal method when the first rod 60 is removed from the accommodating portion 37 will also be described.

Figure 14:
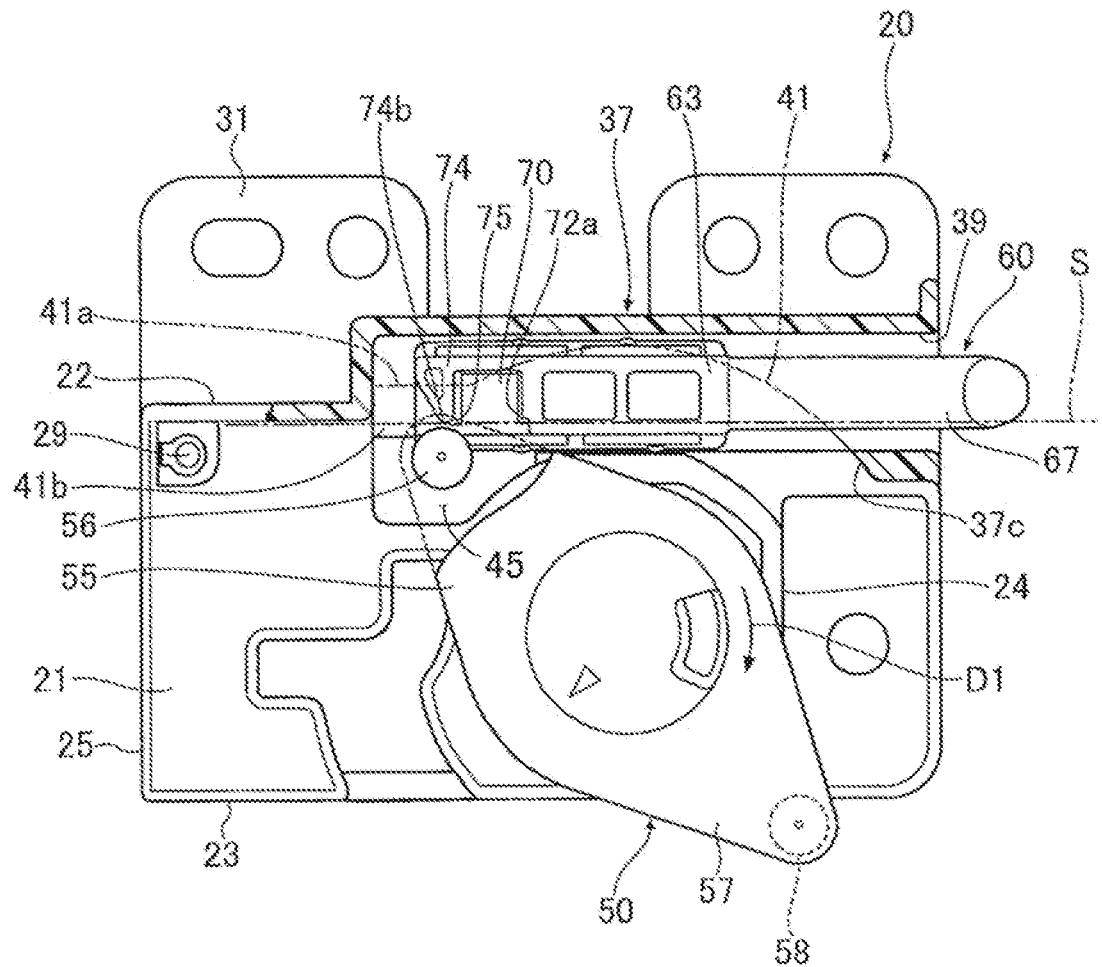
FIG. 14 is a view for describing a first step when the rod is removed from the rotor in the locking device for an opening-closing body illustrated in FIG. 6.

A connection state between the rotor 50 and the first rod 60 may want to be released to remove the first rod 60 from the accommodating portion 37. In this case, as illustrated in FIG. 14, the rotor 50 is rotatable to a position where the protrusion portion (here, the first protrusion portion 56) escapes from a slide path S (direction along a sliding direction of the first rod 60 with respect to the accommodating portion 37) of the top portion 74b of the inclined surface 74a of the rod (first rod 60) with respect to the accommodating portion 37.

For this reason, when the first rod 60 is removed from the accommodating portion 37, the rotor 50 is rotated in the direction opposite the biasing direction D1 against the biasing force of the first biasing member 85 from the state illustrated in FIG. 6 in which the first rod 60 is connected to the rotor 50. Then, as illustrated in FIG. 14, since the rotor 50 is rotatable to the position where the first protrusion portion 56 escapes from the slide path S of the top portion 74b of the inclined surface 74a of the first rod 60 with respect to the accommodating portion 37, the first protrusion portion 56 can be pulled off from the first opening portion 72a of the fitting recessed portion 70. The rotor 50 is rotatable to the extent that a predetermined clearance is generated between the top portion 74b of the inclined surface 74a and the first protrusion portion 56. Thereafter, as illustrated in FIG. 12, in a state where the rotation angle of the rotor 50 is maintained, the first rod 60 is pulled out from the accommodating portion 37, so that the connection state between the rotor 50 and the first rod 60 can be released.

The locking device 10 described above has the following effects.

Referring to FIG. 6, in the locking device 10, the first protrusion portion 56 is configured to be able to enter the accommodating portion 37 through the cutout portion 41 when the rotor 50 is rotated, and further, when the rotor 50 is rotated in a state where the first protrusion portion 56 is located inside the accommodating portion 37 and the first rod 60 is inserted into the accommodating portion 37, the first protrusion portion 56 is configured to be insertable into the fitting recessed portion 70 through the first opening portion 72a. For this reason, as described above, in both the first assembly work and the second assembly work, after a state where the rotor 50 is rotatably supported by the housing 20 (here, the temporary support state of the rotor 50 illustrated in FIG. 7 or the retained hold state of the rotor 50 illustrated in FIG. 9) is set, as illustrated in FIG. 6, the first rod 60 can be connected to the rotor 50 by performing simple work of inserting the rod (first rod 60) into the accommodating portion 37, and the workability of assembling the rotor 50 and the first rod 60 can be improved.

Incidentally, the second protrusion portion 58 on the second extension portion 57 side of the rotor 50 is inserted and fitted to the second rod 61 (refer to FIG. 4) from the second opening portion 71a of the fitting recessed portion 70 of the second rod 61, so that the second rod 61 is connected to the rotor 50. In addition, as illustrated in FIG. 2 or 8, the sliding operation of the second rod 61 is guided by a plurality of guide members 90.

The housing 20 includes the retraction portion 45 at a position adjacent to the accommodating portion 37, the retraction portion 45 accommodating the first protrusion portion 56 that has come off from the fitting recessed portion 70. With a simple configuration, the first protrusion portion 56 is allowed to escape. For this reason, the locking device 10 with respect to which the attachability and detachability of the first rod 60 is high can be provided at low cost.

In addition, the configuration is such that when the first rod 60 is inserted into the accommodating portion 37 from the frame-shaped opening portion 39 in a state where the first protrusion portion 56 has entered the accommodating portion 37 from the cutout portion 41 (refer to FIG. 9), the inclined surface 74a comes into contact with the first protrusion portion 56 (refer to FIG. 10) to rotate the rotor 50 against the biasing force (refer to FIG. 11), and when the first protrusion portion 56 climbs over the inclined surface 74*a* (refer to FIG. 12), as illustrated in FIG. 6, the first protrusion portion 56 is inserted into the fitting recessed portion 70 by the biasing force.

According to this mode, as illustrated in FIG. 6, the first protrusion portion 56 is inserted and fitted into the fitting recessed portion 70 by performing simple work of inserting and pushing the rod (first rod 60) into the accommodating portion 37 from the frame-shaped opening portion 39 in a state where the first protrusion portion 56 has entered the accommodating portion 37 from the cutout portion 41 as illustrated in FIG. 9, so that the connection between the rotor 50 and the first rod 60 can be completed, and the workability of assembling the rotor 50 and the first rod 60 can be further improved.

Further, the rod includes the first rod 60 to be inserted into the accommodating portion 37, and the second rod 61 extending longer than the first rod 60, and the protrusion portion includes the first protrusion portion 56 to be fitted into the fitting recessed portion 70 of the first rod 60, and the second protrusion portion 58 formed on the extension portion (second extension portion 57) extending from an outer periphery of the housing 20, to protrude in the same direction as that of the first protrusion portion 56 and to be fitted into the fitting recessed portion 70 of the second rod 61.

According to this mode, since the first rod 60 shorter than the second rod 61 is connected to the first protrusion portion 56 of the first extension portion 55 through the fitting recessed portion 70 in a state where the first rod 60 is accommodated in the accommodating portion 37 of the housing 20, it can be made difficult for the first rod 60 to come off from the rotor 50. In addition, since the second rod 61 longer than the first rod 60 is connected to the second protrusion portion 58 of the second extension portion 57 protruding from the outer periphery of the housing 20, through the fitting recessed portion 70, the housing 20 does not require the accommodating portion for accommodating the second rod 61 that is long, so that the housing 20 can be made compact.

In addition, as illustrated in FIG. 14, the rotor 50 is rotatable to the position where the protrusion portion (here, the first protrusion portion 56) escapes from the slide path S (direction along the sliding direction of the first rod 60 with respect to the accommodating portion 37) of the top portion 74*b* of the inclined surface 74*a* of the rod (first rod 60) with respect to the accommodating portion 37. Namely, as described above, the wide portion 41*b* having a constant width is formed from the other end side of the arc-shaped portion of the cutout portion 41 toward the other end L2 side of the housing 20, and the wide portion 41*b* is disposed to be offset to an inside of the housing 20 with respect to the slide path S of the top portion 74*b* of the inclined surface 74*a* of the first rod 60 (shifted to the side wall 23 of the housing 20). As a result, the rotor 50 is rotatable to the position where the first protrusion portion 56 escapes from the slide path S of the top portion 74*b* of the inclined surface 74*a* of the first rod 60.

Figure 15:
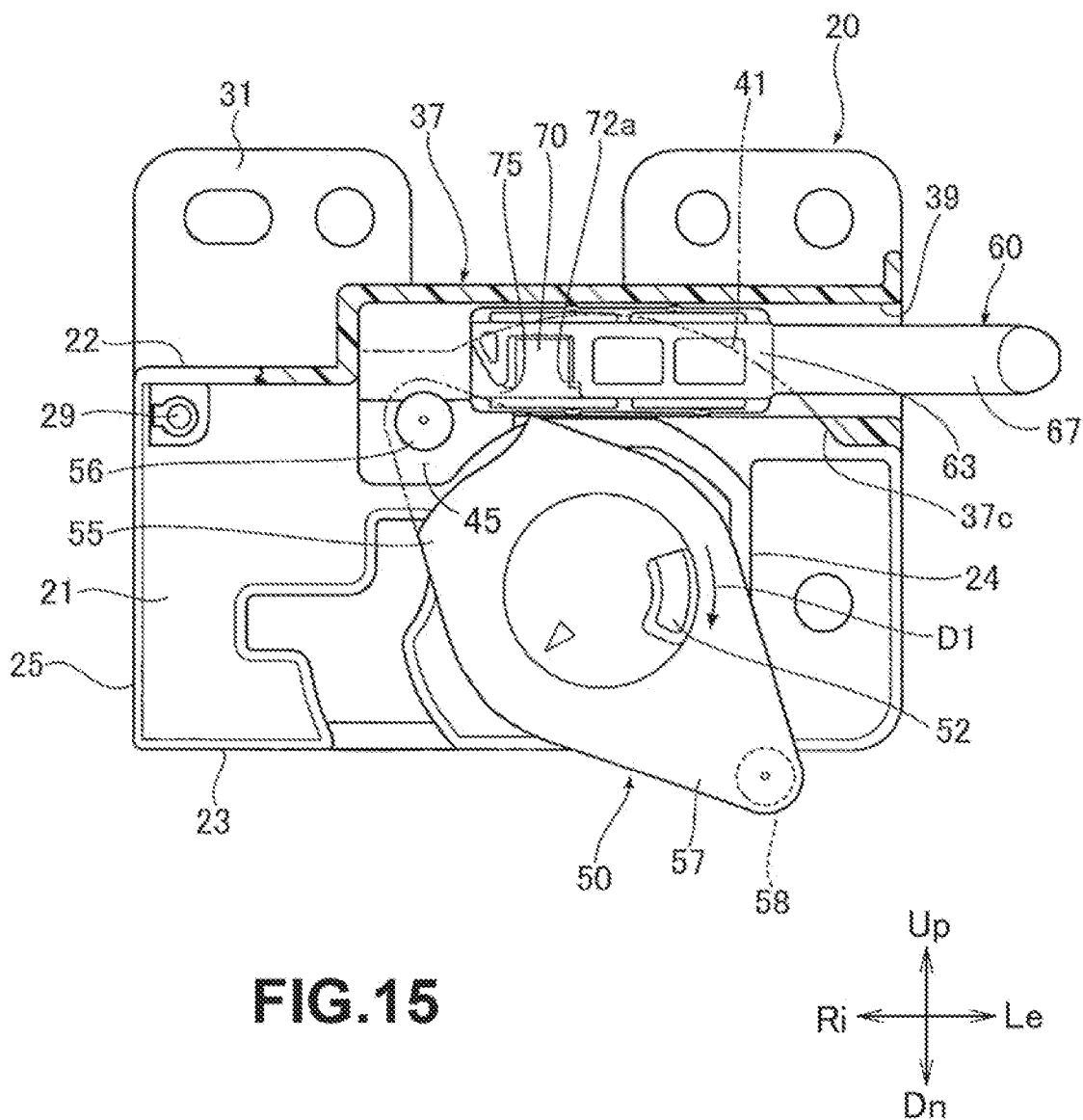
FIG. 15 is a view for describing a second step when the rod is removed from the rotor in the locking device for an opening-closing body illustrated in FIG. 14.

When the first rod 60 is removed, as illustrated in FIG. 15, in a state where the rotation angle of the rotor 50 is maintained, the first rod 60 is pulled out from the accommodating portion 37 (first rod 60 is displaced in an exit direction), so that the connection state between the rotor 50 and the first rod 60 can be released. For this reason, the work of removing the first rod 60 from the accommodating portion 37 is facilitated. In addition, since the gap 75 is formed between the top portion 74*b* of the inclined surface 74*a* and the first opening portion 72*a* (refer to FIG. 11), the first protrusion portion 56 can be pulled out from the fitting recessed portion 70 by using the gap 75 from the first opening portion 72*a*, so that the first protrusion portion 56 is easily and smoothly pulled off from the fitting recessed portion 70.

In addition, in the locking device 10, since the first rod 60 is inserted into the accommodating portion 37 having a long frame shape of the housing 20 and the sliding operation of the first rod 60 is guided, it is not necessary to separately provide the guide members 90 (refer to FIG. 2) required for the second rod 61 and the like, so that the number of components can be reduced, and the guide structure of the first rod 60 can be simplified.

Second Embodiment

Figure 16:
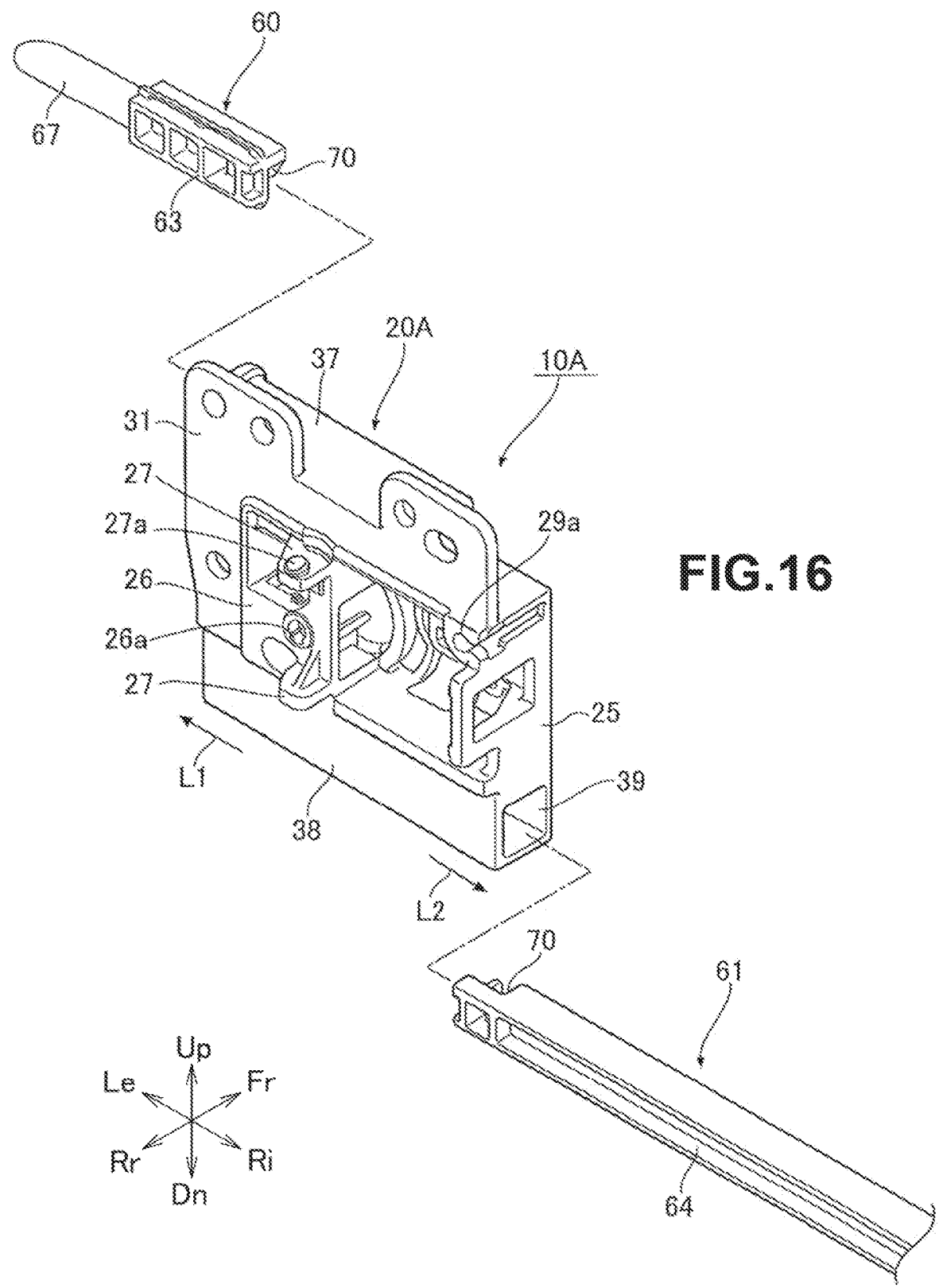
FIG. 16 is an exploded perspective view of a locking device for an opening-closing body according to a second embodiment.
Figure 17:
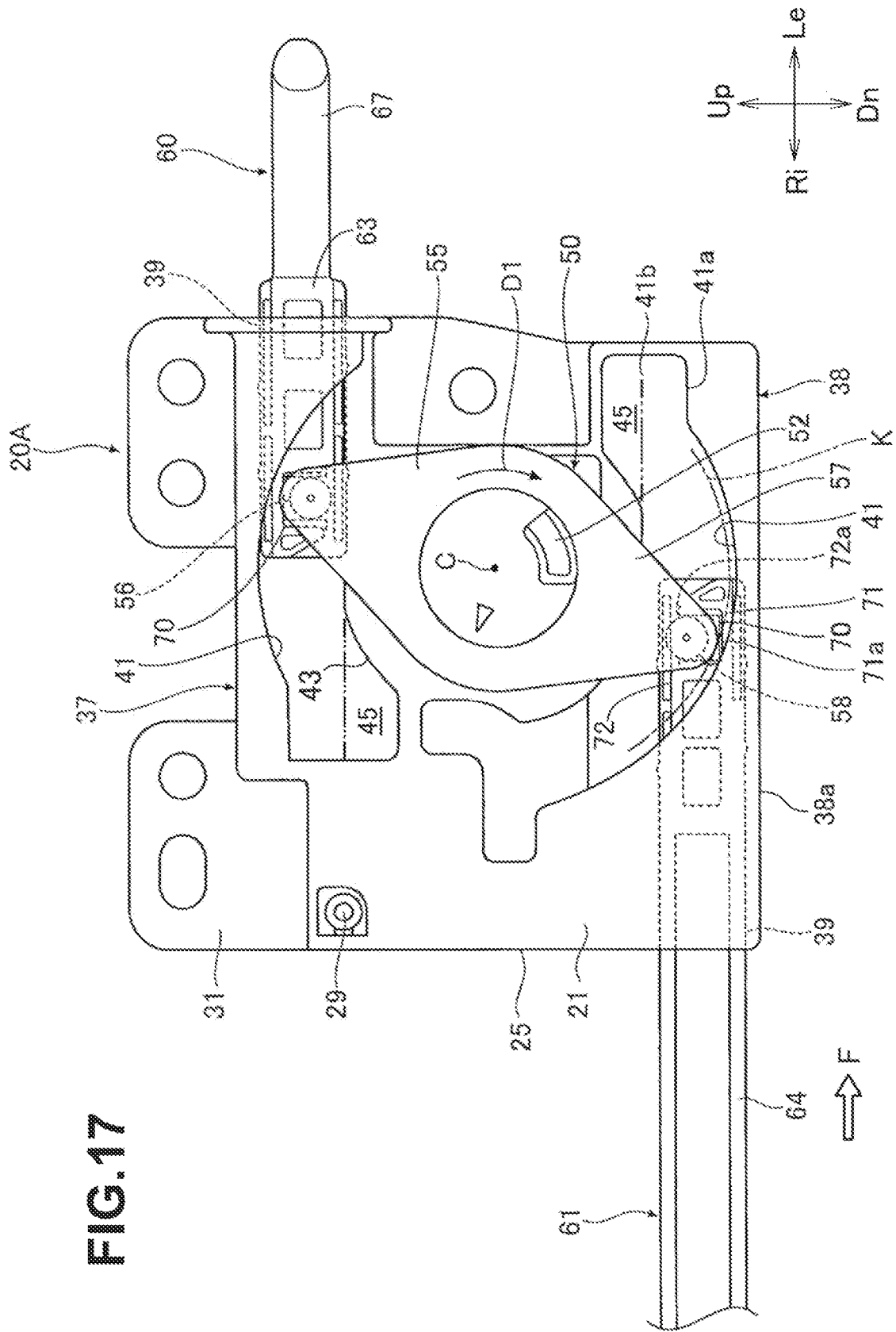
FIG. 17 is a view of the locking device for an opening-closing body illustrated in FIG. 16 when viewed from the front.

FIG. 16 and FIG. 17 illustrate another embodiment of the locking device for an opening-closing body according to the invention. Incidentally, portions that are substantially the same as those of the embodiment will be denoted by the same reference signs, and a description thereof will not be repeated.

A locking device 10A for an opening-closing body (hereinafter, simply also referred to as the "locking device 10A") has a configuration in which a housing 20A includes two accommodating portions. In the housing 20A, an accommodating portion 38 having a long frame shape and extending over the entire region from the one end L1 side to the other end L2 side in the longitudinal direction of the housing 20A is provided on an outer surface of the side wall 23. Namely, the housing 20A includes the accommodating portion 37 formed on the side wall 22 side to accommodate the first rod 60, and the accommodating portion 38 formed on the side wall 23 side to accommodate the second rod 61.

In addition, the one end L1 side of the accommodating portion 38 is closed, the frame-shaped opening portion 39 having a substantially quadrangular hole shape is formed on the other end L2 side, and the second rod 61 is movable in and out from the frame-shaped opening portion 39. Further, as illustrated in FIG. 17, the cutout portion 41 that is cut out in a substantially arc shape along a rotation trajectory K of the rotor 50 is formed in a bottom wall 38*a* of the accommodating portion 38. In addition, the linear portion 41*a* is formed on the other end side of the cutout portion 41 opposite the frame-shaped opening portion 39 (one end L1 side of the housing 20A), and the wide portion 41*b* having a constant width is formed through the linear portion 41*a*.

Further, the retraction portion 45 which is a space adjacent to the arc surface portion 43 and into which the first protrusion portion 56 can be retracted when the first rod 60 is pushed in is formed in the housing 20A. The retraction portion 45 is a space that is continuously formed from the accommodating portion 37, and only the first protrusion portion 56 can enter the retraction portion 45. In other words, the first rod 60 cannot enter the retraction portion 45.

Similarly, the retraction portion 45 which is a space adjacent to the arc surface portion 43 and into which the second protrusion portion 58 can be retracted when the second rod 61 is pushed in is formed in the housing 20A. The retraction portion 45 is a space that is continuously formed from the accommodating portion 38, and only the second protrusion portion 58 can enter the retraction portion 45. In other words, the second rod 61 cannot enter the retraction portion 45.

Then, a rod assembly work is performed as follows. Namely, from a state where the rotor 50 is temporarily supported to be rotatable with respect to the housing 20A, the rotor 50 is rotated in the direction opposite the biasing direction D1, and the rotor 50 is retained and held with respect to the housing 20. In this state, the first rod 60 is inserted into the accommodating portion 37 from the frame-shaped opening portion 39 on an accommodating portion 37 side along the insertion direction E, so that the first protrusion portion 56 that has entered the accommodating portion 37 through the cutout portion 41 climbs over the inclined surface 74a to be inserted and fitted into the fitting recessed portion 70 of the first rod 60, and the first rod 60 is connected to the rotor 50.

Thereafter, the second rod 61 is inserted into the accommodating portion 38 from the frame-shaped opening portion 39 on an accommodating portion 38 side along an insertion direction F, so that the second protrusion portion 58 that has entered the accommodating portion 37 through the cutout portion 41 climbs over the inclined surface 74a to be inserted and fitted into the fitting recessed portion 70 of the second rod 61, and the second rod 61 is connected to the rotor 50.

As a result, as illustrated in FIG. 17, the pair of rods 60 and 61 can be connected to the rotor 50. Incidentally, after the second rod 61 is connected to the rotor 50 first, the first rod 60 may be connected to the rotor 50.

As described above, in addition to the first rod 60, the second rod 61 can also be connected to the rotor 50 by performing simple work of inserting and pushing the second rod 61 into the accommodating portion 38, and the workability of assembling the rotor 50 and the pair of rods 60 and 61 can be improved.

Incidentally, the invention is not limited to the above-described embodiments. Various modification embodiments can be implemented within the concept of the invention, and such embodiments are also included in the scope of the invention.

INDUSTRIAL APPLICABILITY

The locking device of the invention is suitable for a glove box for vehicle.

EXPLANATIONS OF LETTERS OR NUMERALS

1 INSTRUMENT PANEL (FIXED BODY), 1b LOCKING PORTION
5 LID (OPENING-CLOSING BODY)
10, 10A LOCKING DEVICE FOR OPENING-CLOSING BODY
20, 20A HOUSING
37, 38 ACCOMMODATING PORTION
45 RETRACTION PORTION
50 ROTOR
56 FIRST PROTRUSION PORTION (PROTRUSION PORTION)
57 SECOND EXTENSION PORTION (EXTENSION PORTION)
58 SECOND PROTRUSION PORTION (PROTRUSION PORTION)
60 FIRST ROD (ROD)
61 SECOND ROD (ROD)
70 FITTING RECESSED PORTION
74a INCLINED SURFACE
GB GLOVE BOX (STORAGE DEVICE FOR VEHICLE)

The invention claimed is:

1. A locking device for an opening-closing body that is openably and closably attached to an opening portion of a fixed body, the locking device comprising:
a housing attached to one of the fixed body and the opening-closing body;
a rotor that is rotatably supported by the housing so as to be rotatable around a rotation axis; and
at least one rod that moves in and out of the housing when the rotor rotates, said at least one rod extending away from the housing along a rod slide path and being movable back and forth along the rod slide path, said rod engaging with and disengaging from a locking portion provided in an other of the fixed body and the opening-closing body,
wherein the housing includes an accommodating portion that slidably receives therein the at least one rod, said accommodating portion defining an opening aligned with the slide path and through which the at least one rod slidably moves as the at least one rod moves back and forth along the rod slide path,
the rotor includes a protrusion portion protruding in a direction parallel to the rotation axis,
the at least one rod includes a fitting recessed portion into which the protrusion portion is received, and
wherein the rotor is configured to be rotatable to a position where the protrusion portion is released from direct contact with the fitting recessed portion,
wherein the housing comprises a retraction portion at a position adjacent to the accommodating portion, wherein the protrusion portion is received in the retraction portion when the protrusion portion is released from the fitting recessed portion.

2. A locking device for an opening-closing body that is openably and closably attached to an opening portion of a fixed body, the locking device comprising:
a housing attached to one of the fixed body and the opening-closing body;
a rotor that is rotatably supported by the housing so as to be rotatable around a rotation axis; and
at least one rod that moves in and out of the housing when the rotor rotates, said at least one rod extending away from the housing along a rod slide path and being movable back and forth along the rod slide path, said rod engaging with and disengaging from a locking portion provided in an other of the fixed body and the opening-closing body,
wherein the housing includes an accommodating portion that slidably receives therein the at least one rod, said accommodating portion defining an opening aligned with the slide path and through which the at least one rod slidably moves as the at least one rod moves back and forth along the rod slide path,
the rotor includes a protrusion portion protruding in a direction parallel to the rotation axis,
the at least one rod includes a fitting recessed portion into which the protrusion portion is received, and
wherein the rotor is configured to be rotatable to a position where the protrusion portion is released from direct contact with the fitting recessed portion,
wherein a distal end of the rod has an inclined surface that comes into contact with the protrusion portion when the rod is inserted into the accommodating portion, said inclined surface being inclined with respect to a traveling direction of the rod such that the protrusion portion is guided into the fitting recessed portion when the rod is inserted into the accommodating portion in a state where the protrusion portion is in contact with the rod.

3. A locking device for an opening-closing body that is openably and closably attached to an opening portion of a fixed body, the locking device comprising:
- a housing attached to one of the fixed body and the opening-closing body;
- a rotor that is rotatably supported by the housing so as to be rotatable around a rotation axis; and
- at least one rod that moves in and out of the housing when the rotor rotates, said at least one rod extending away from the housing along a rod slide path and being movable back and forth along the rod slide path, said rod engaging with and disengaging from a locking portion provided in an other of the fixed body and the opening-closing body,
- wherein the housing includes an accommodating portion that slidably receives therein the at least one rod, said accommodating portion defining an opening aligned with the slide path and through which the at least one rod slidably moves as the at least one rod moves back and forth along the rod slide path,
- the rotor includes a protrusion portion protruding in a direction parallel to the rotation axis,
- the at least one rod includes a fitting recessed portion into which the protrusion portion is received, and
- wherein the rotor is configured to be rotatable to a position where the protrusion portion is released from direct contact with the fitting recessed portion;
- wherein the at least one rod comprises a first rod to be inserted into the accommodating portion, and a second rod, said second rod having a length that is greater than a length of the first rod, and
- the protrusion portion comprises a first protrusion portion to be fitted into a fitting recessed portion of the first rod, and a second protrusion portion formed on an extension portion extending from an outer periphery of the housing, wherein the first protrusion portion and the second protrusion portion protrude parallel to one another in the rotation axis direction, and wherein the second protrusion portion is fitted into a fitting recessed portion of the second rod.

4. A storage device for vehicle
wherein the locking device for an opening-closing body according to claim 3 is used.

5. The locking device for an opening-closing body according to claim 3, wherein the fitting recessed portion defines a first opening portion through which the protrusion portion is inserted into the fitting recessed portion and pulled from the fitting recessed portion.

* * * * *